US012676769B2

(12) United States Patent (10) Patent No.: US 12,676,769 B2
Zhao et al. (45) Date of Patent: Jul. 7, 2026

(54) METHOD AND APPARATUS FOR ESTABLISHING CONNECTION, STORAGE MEDIUM AND SERVER

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Hongbo Feng, Beijing (CN); Shaobei Chen, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 18/555,050

(22) PCT Filed: Mar. 28, 2022

(86) PCT No.: PCT/CN2022/083402
§ 371 (c)(1),
(2) Date: Oct. 12, 2023

(87) PCT Pub. No.: WO2022/222698
PCT Pub. Date: Oct. 27, 2022

(65) Prior Publication Data
US 2024/0205042 A1 Jun. 20, 2024

(30) Foreign Application Priority Data

Apr. 19, 2021 (CN) .......................... 202110419459.5

(51) Int. Cl.
*H04L 12/28* (2006.01)

(52) U.S. Cl.
CPC ...... *H04L 12/2816* (2013.01); *H04L 12/2812* (2013.01); *H04L 2012/2849* (2013.01)

(58) Field of Classification Search
CPC ............. H04L 12/2803; H04L 12/2805; H04L 12/2807; H04L 12/2809; H04L 12/2812;
(Continued)

(56) References Cited

U.S. PATENT DOCUMENTS 6,826,624 B1 * 11/2004 Fell, Jr. ................... H04L 67/51
707/E17.115
2003/0139934 A1 * 7/2003 Mandera ............. H04L 61/4541
705/1.1
(Continued)

FOREIGN PATENT DOCUMENTS

CN 102740466 B 3/2016
CN 107770843 A 3/2018
(Continued)

OTHER PUBLICATIONS

Amsüss et al., "CoRE Resource Directory", IETF Internet Draft, draft-ietf-core-resource-directory-28, Mar. 7, 2021 (Year: 2021).*
(Continued)

*Primary Examiner* — Vivek Srivastava
*Assistant Examiner* — William C McBeth
(74) *Attorney, Agent, or Firm* — Myers Bigel, P.A.

(57) ABSTRACT

The present disclosure provides a method and an apparatus for establishing a connection, a storage medium and a server. The method is applied to a server, including receiving a connection request of a requesting party, wherein the connection request includes target information specified by the requesting party, and the target information being for characterizing a capability of a target party to which the requesting party desires to connect, determining target parties from a relationship mapping table according to the target infor-
(Continued)

mation specified by the requesting party, the relationship mapping table comprising a correspondence between at least one target party and at least one target information, and establishing connections between the requesting party and at least part of determined target parties. The present disclosure realizes rapid establishment of a connection between the requesting party and one or more target parties so as to quickly acquire information required by the user.

13 Claims, 11 Drawing Sheets

(58) Field of Classification Search
CPC ............... H04L 12/2816; H04L 12/283; H04L 61/4541; H04L 67/12; H04L 67/125; H04L 67/141; H04L 67/303; H04L 67/51; H04L 67/56; H04L 67/562; H04L 67/025; H04L 67/50
See application file for complete search history.

(56) References Cited

U.S. PATENT DOCUMENTS

2008/0080392 A1* 4/2008 Walsh ................. H04L 61/4541
                                                    370/254
2009/0046842 A1* 2/2009 Allen .................. H04L 65/1069
                                                    379/201.01
2015/0264134 A1* 9/2015 Dong ...................... H04L 67/51
                                                    709/204
2017/0187696 A1* 6/2017 Ahuja ..................... H04L 67/51
2018/0152525 A1* 5/2018 Kapoor .................. H04L 67/51
2019/0238597 A1* 8/2019 Keränen .............. H04L 67/562
2020/0293423 A1    9/2020 Carbonell et al.
2021/0219117 A1* 7/2021 Novo Diaz ............. H04L 67/51

FOREIGN PATENT DOCUMENTS

CN          109327503 A      2/2019
CN          111160895 A      5/2020
WO          2019192722 A1   10/2019

OTHER PUBLICATIONS

Extended European search report of EP Patent Application No. 22790807.6 (Jan. 20, 2025).
International Search Report and Written Opinion for PCT/CN2022/083402; mailed May 27, 2022 (11 pages, with English translation).
Supplementary Notice for Chinese patent application 202110419459.5; issued May 7, 2021 (2 pages, with English translation).

* cited by examiner

METHOD AND APPARATUS FOR ESTABLISHING CONNECTION, STORAGE MEDIUM AND SERVER

RELATED APPLICATIONS

The present application is the U.S. national phase entry of PCT/CN2022/083402, with an international filing date of Mar. 28, 2022, which claims the benefit of Chinese Patent Application No. 202110419459.5, filed on Apr. 19, 2021, the entire disclosures of which are incorporated herein by reference.

FIELD

The present disclosure relates to the field of Internet of Things technology, particularly to a method and an apparatus for establishing a connection, a storage medium and a server.

BACKGROUND

With the development of the Internet of Things (IoT) and network technologies, remote information interaction has been popularized. For example, the terminal APP of a requesting party and the terminal device of a target party are connected to a cloud, and the terminal APP establishes a connection with the terminal device of the target party via the cloud, so as to realize acquisition of content/information on the terminal device.

However, as the number of terminal devices increases rapidly, at the time of employing the traditional method of acquiring content/information by establishing a connection with a terminal device, it is impossible to determine which terminal device(s) the content/information to be acquired exists in, making the process of acquiring content/information very cumbersome. Especially in the case where the number of IoT devices is increasing rapidly, it will be more difficult to look for corresponding content/information on terminal devices.

SUMMARY

In the art, there is an urgent need to solve the problem of how to quickly establish a connection between a requesting party (such as terminal APP) and one or more target parties (such as terminal devices) so as to quickly acquire information required by the user.

The present disclosure provides a method and an apparatus for establishing a connection, a storage medium and a server, so as to solve or alleviate the problem of quickly establishing a connection between a requesting party and one or more target parties, so as to quickly acquire information required by the user.

According to a first aspect of the present disclosure, there is provided a method for establishing a connection, which can be applied to a server, comprising:

receiving a connection request of a requesting party, wherein the connection request comprises target information specified by the requesting party, and the target information being for characterizing a capability of a target party to which the requesting party desires to connect;

determining target parties from a relationship mapping table according to the target information specified by the requesting party, the relationship mapping table comprising a correspondence between at least one target party and at least one target information;

establishing connections between the requesting party and at least part of determined target parties.

In some implementations, the target information comprises at least one of type information and content information, the type information is indicative of a type of information that can be collected by a target party, and the content information is indicative of content of information that can be collected by a target party.

In some implementations, the target information comprises an information label, the information label comprising at least one of a type label established according to the type information and a content label established according to the content information; and wherein the type information is indicative of a type of information that can be collected by a target party, and the content information is indicative of content of information that can be collected by a target party.

In some implementations, the relationship mapping table is established by steps as follows, the steps comprising:

acquiring at least one of type information and content information of at least one target party;

establishing a relationship mapping table in response to acquiring type information, so that the relationship mapping table comprises a correspondence between the at least one target party and the type information; and establishing a relationship mapping table in response to acquiring content information, so that the relationship mapping table comprises a correspondence between the at least one target party and the content information.

In some implementations, the relationship mapping table is established by steps as follows, the steps comprising:

establishing a mapping table between at least one target party and at least one information label as the relationship mapping table, and wherein said determining target parties from a relationship mapping table according to the target information specified by the requesting party comprises:

determining the target party from the mapping table between at least one target party and at least one information label according to the target information specified by the requesting party.

In some implementations, said establishing a mapping table between at least one target party and at least one information label comprises:

acquiring at least one of type information and content information of the at least one target party;

in response to acquiring type information, determining an information label according to the type information;

in response to acquiring content information, determining an information label according to the content information;

based on a determined information label, establishing a mapping table between the at least one target party and the determined information label.

In some implementations, said acquiring at least one of type information and content information of the at least one target party comprises:

sending an information acquisition request to acquire at least one of type information and content information of the at least one target party; or acquiring at least one of type information and content information reported by the at least one target party during a registration process.

In some implementations, the determined target parties comprise a terminal device, and wherein said establishing connections between the requesting party and at least part of determined target parties comprises:

reconstructing the connection request, so that the reconstructed connection request comprises identification information of the terminal device;

sending the reconstructed connection request to the terminal device to establish a connection between the requesting party and the terminal device.

In some implementations, the determined target parties comprise multiple terminal devices, and wherein said establishing connections between the requesting party and at least part of determined target parties comprises:

reconstructing the connection request so that the reconstructed connection request comprises identification information of the multiple terminal devices;

sending the reconstructed connection request to the multiple terminal devices to enable the multiple terminal devices to perform an operation according to the target information;

acquiring response information sent by the multiple terminal devices for the reconstructed connection request, wherein the response information comprises a result of performing an operation by each terminal device of the multiple terminal devices according to the target information, the result indicating whether said each terminal device performs the operation successfully or not;

establishing a connection between the requesting party and a terminal device of the multiple terminal devices with the result in the response information being success.

In some implementations, said sending the reconstructed connection request to the multiple terminal devices comprises:

sending the reconstructed connection request to the multiple terminal devices simultaneously or sequentially.

In some implementations, the determined target parties are multiple in number and form a device chain, the device chain is a combination of target parties with connection relationships built according to a network topology structure; and wherein said establishing connections between the requesting party and at least part of determined target parties comprises:

reconstructing the connection request, the reconstructed connection request comprising identification information of a target party at a chain head of the device chain;

sending the reconstructed connection request to the target party at the chain head of the device chain to establish connections between the requesting party and at least part of determined target parties.

In some implementations, said sending the reconstructed connection request to the target party at the chain head of the device chain to establish connections between the requesting party and at least part of determined target parties further comprises:

acquiring first response information sent by the target party at the chain head for the reconstructed connection request, the first response information comprising a result of performing an operation by the target party at the chain head according to the target information, the result indicating whether the target party at the chain head performs the operation successfully or not;

in the case that the first response information is success, establishing a connection between the requesting party and the target party at the chain head;

in the case that the first response information is non-success, acquiring second response information of a target party connected to the target party at the chain head in the device chain for the reconstructed connection request, the second response information comprising a result of performing an operation by a connected target party according to the target information, the result indicating whether the connected target party performs said operation successfully or not;

in the case that the second response information is success, establishing a connection between the requesting party and the target party connected to the target party at the chain head in the device chain.

In some implementations, said sending the reconstructed connection request to the target party at the chain head of the device chain to establish connections between the requesting party and at least part of determined target parties further comprises:

acquiring third response information sent by a target party at a chain tail of the device chain, the third response information comprising a result of performing an operation by the target party at the chain tail according to the target information, the result indicating whether the target party at the chain tail performs the operation successfully or not;

in the case that the third response information is success, establishing a connection between the requesting party and the target party at the chain tail of the device chain.

In some implementations, the determined target parties are multiple in number and form multiple device chains, the device chains are combinations of target parties with connection relationships built according to a network topology structure; and wherein said establishing connections between the requesting party and at least part of determined target parties comprises:

selecting a device chain from the multiple device chains according to a preset rule;

reconstructing the connection request, wherein the reconstructed connection request comprises identification information of a target party at a chain head of a selected device chain;

sending a reconstructed connection request to the target party at the chain head of the selected device chain to enable the target party in the selected device chain to perform an operation according to the target information;

acquiring response information sent by the target party in the selected device chain for the reconstructed connection request, the response information comprising a result of performing an operation by the target party in the selected device chain according to the target information, the result indicating whether the target party in the selected device chain performs the operation successfully;

establishing a connection between the requesting party and a target party in the selected device chain whose result of the response information is success.

In some implementations, the preset rule comprises at least one of:

selecting a device chain of the multiple device chains that has a longest length;

selecting a device chain of the multiple device chains that employs a preset networking mode;

selecting a device chain of the multiple device chains in which a target party at a chain head has the best processing capacity.

In some implementations, in response to the target information specified by the requesting party comprising a first content label, said determining the target party from the mapping table between at the least one target party and at least one information label according to the target information specified by the requesting party comprises:

determining a first target party from the mapping table between at least one target party and at least information label according to the first content label; and wherein said establishing connections between the requesting party and at least part of determined target parties comprises:

reconstructing the connection request, the reconstructed connection request comprising identification information of the first target party;

sending the reconstructed connection request to the first target party to enable the first target party to perform an operation according to the first content label;

acquiring response information sent by the first target party, the response information comprising a result of performing an operation by the first target party according to the first content label, the result indicating whether the first target party performs the operation successfully or not;

in response to the result being non-success, determining a second content label associated with the first content label, wherein a range of content information of the second content label is larger than a range of content information of the first content label;

determining a second target party from the mapping table between at least one target party and at least information label according to the second content label;

re-reconstructing a content request, the re-reconstructed connection request comprising identification information of the second target party;

sending the re-reconstructed connection request to the second target party to enable the second target party to perform an operation according to the second content label;

acquiring response information sent by the second target party, the response information comprising a result of performing an operation by the second target party according to the second content label, the result indicating whether the second target party performs the operation successfully or not;

establishing a connection between the requesting party and a second target party with the result being success.

In some implementations, the target information does not comprise identification information of the target party.

According to a second aspect of the present disclosure, there is provided an apparatus for establishing a connection, comprising:

a receiver, configured to receive a connection request of a requesting party, wherein the connection request comprises target information specified by the requesting party, and the target information being for characterizing characterize a capability of a target party to which the requesting party desires to connect;

a determining device, configured to determine target parties from a relationship mapping table according to the target information specified by the requesting party, the relationship mapping table comprising a correspondence between at least one target party and at least one target information;

a connector, configured to establish connections between the requesting party and at least part of determined target parties.

According to a third aspect of the present disclosure, there is provided a computer readable storage medium storing a computer executable instruction, the computer executable instruction, when executed by one or more processors, implementing the method for establishing a connection described in the first aspect.

According to a fourth aspect of the present disclosure, there is provided a server, comprising a memory and a processor, the memory storing a computer executable instruction, the computer executable instruction, when executed by a processor, implementing the method for establishing a connection described in the first aspect.

In some implementations, in the case that the target information comprises one of type information and a type label, the server comprises one of a cloud server and an edge server.

In some implementations, in the case that the target information comprises one of content information and a content label, the server comprises an edge server.

In some implementations, in the case that the target information comprises a content label, the server comprises an edge server and a cloud server; and wherein the cloud server is configured to receive a connection request of a requesting party, the connection request comprises a content label specified by the requesting party;

the edge server is configured to receive a connection request received and sent by the cloud server.

According to a fifth aspect of the present disclosure, there is provided a computer program product, comprising a computer executable instruction, wherein the computer executable instruction, when executed by a processor, executes the method for establishing a connection 5 described in the first aspect.

BRIEF DESCRIPTION OF THE DRAWINGS

In order to illustrate the technical solutions of embodiments of the present disclosure more clearly, the drawings to be used in the embodiments will be simply introduced below. It should be understood that the following drawings only illustrate certain embodiments of the present disclosure, thus they should not be regarded as limiting the scope. For a person having an ordinary skill in the art, other relevant drawings may be further obtained based on these drawings without undue experimentation.

DETAILED DESCRIPTION

Figures 1, 2:
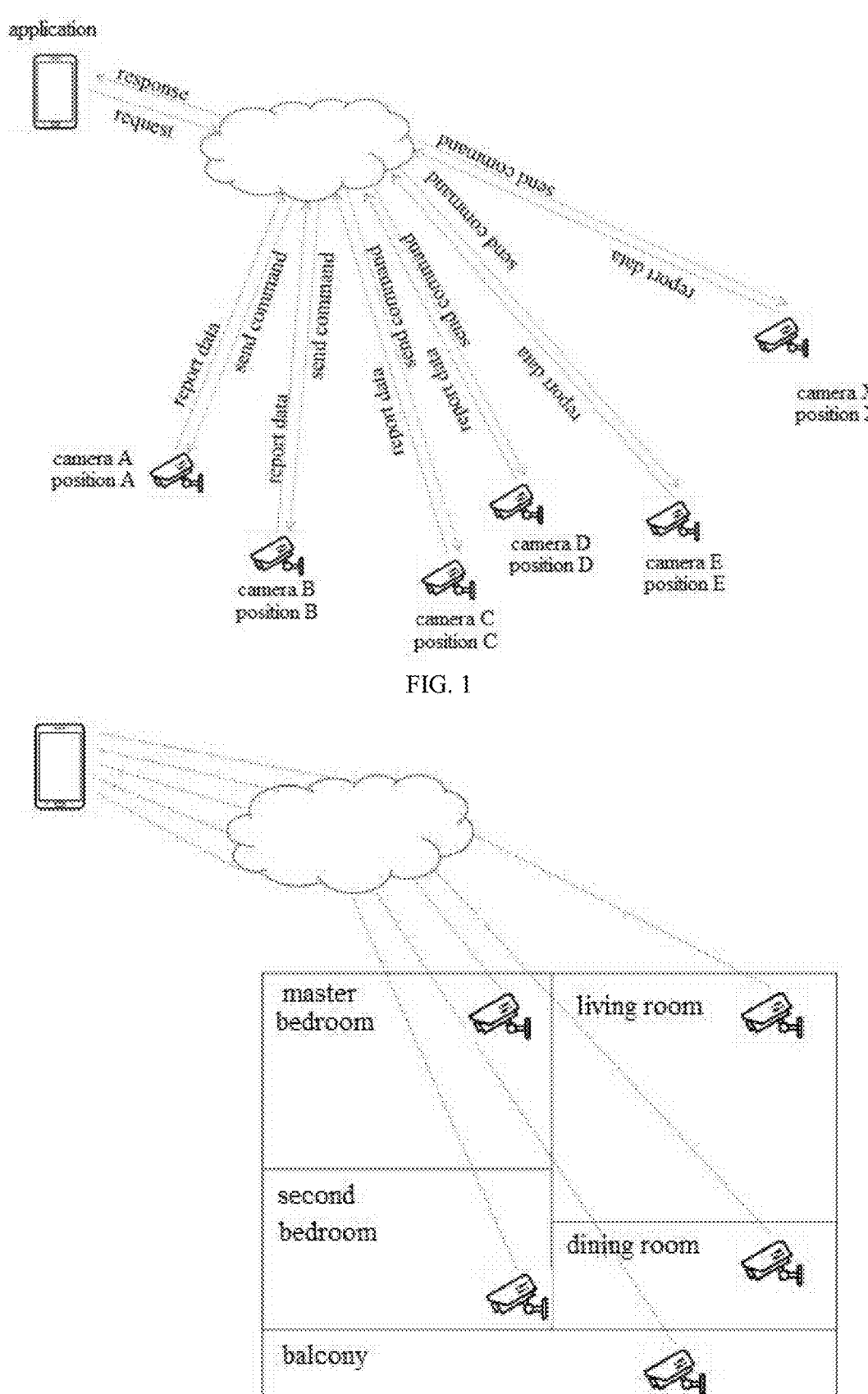
FIG. 1 is an application example of a vehicle control deployment according to an embodiment of the present disclosure.
FIG. 2 is an application example of a smart home according to an embodiment of the present disclosure.

The technical solutions in embodiments of the present disclosure will be described clearly and comprehensively below in conjunction with the drawings in the present disclosure. Obviously, the described embodiments are only part of the embodiments of the present disclosure, rather than all of them. Generally, the components of embodiments of the present disclosure described and illustrated in the drawings may be arranged and designed with various configurations. Therefore, the detailed description of embodiments of the present disclosure provided in the drawings below is not intended to limit the protection scope of the present disclosure, but only represents embodiments of the present disclosure. All other embodiments obtained by those skilled in the art based on the embodiments of the present disclosure without spending inventive efforts fall within the protection scope of the present disclosure.

With the popularity of the Internet of Things (IoT), everyone will possess more and more IoT devices. However, as the number of terminal devices increases rapidly, at the time of employing the traditional method of acquiring content/information by establishing a connection with a terminal device, it is impossible to determine which terminal device(s) the content/information to be acquired exists in, making the process of acquiring content/information very cumbersome. Especially in the case where the number of IoT devices is increasing rapidly, it will be more difficult to look for corresponding content/information on terminal devices.

Taking city security as an example, a city will lay out a large number of terminal devices such as bayonets and electric policemen. These devices have functions of identifying vehicle information (e.g., license plate, model, color, etc.) and/or human information (clothes color, pants color, etc.), and so on. The terminal devices such as bayonets and electric policemen acquire vehicle data in real time and upload it to the cloud system (such as the cloud server). The business application compares information of a controlled vehicle with the real-time data received by the cloud system, determines an identification of a terminal device such as a target bayonet and a target electric policeman after successful comparison, and establishes a connection with the terminal device such as a target bayonet and a target electric policeman.

FIG. 1 illustrates an example of a vehicle control application. The server compares information of controlled vehicles with a vehicle reported in real time by a camera. If the comparison is successful, it is possible to obtain a camera corresponding to the successful comparison recording, and further establish a real-time connection with the camera.

The above scenario takes security as an example. The data collected by a terminal device is sent to and stored in the cloud server. The cloud server analyzes the data collected by the terminal device to determine a terminal device that can match the content of the user's request. In the scenario of city security, in order to ensure the safety of all residents of the city, data collected by the terminal devices is open to the cloud server. Therefore, the cloud server has the right to acquire data collected by all security devices and perform intelligent analysis.

However, in the fields such as smart homes and intelligent communities, data collected by terminal devices belongs to users. Since the user privacy is involved, the cloud platform/cloud server has no right to independently collect user data and analyzes user data.

Taking the smart home as an example, FIG. 2 illustrates an application example of a smart home, with multiple cameras installed at home. When the user desires to check on the child at home, there are currently several ways as follows: (1) In the case that the cameras belong to products of different enterprises, different enterprises usually provide different access interfaces such as APPs, and different APPs are required to be opened to access corresponding cameras so as to further determine a target camera to be connected. (2) In the case that the cameras belong to the same enterprise, one APP is required to be opened and different cameras are selected to check separately. The above processes both require the user to perform multiple operations in order to achieve connections with terminal devices (i.e., cameras) so as to check on corresponding information (e.g., child), resulting in poor user experience.

Figure 3:
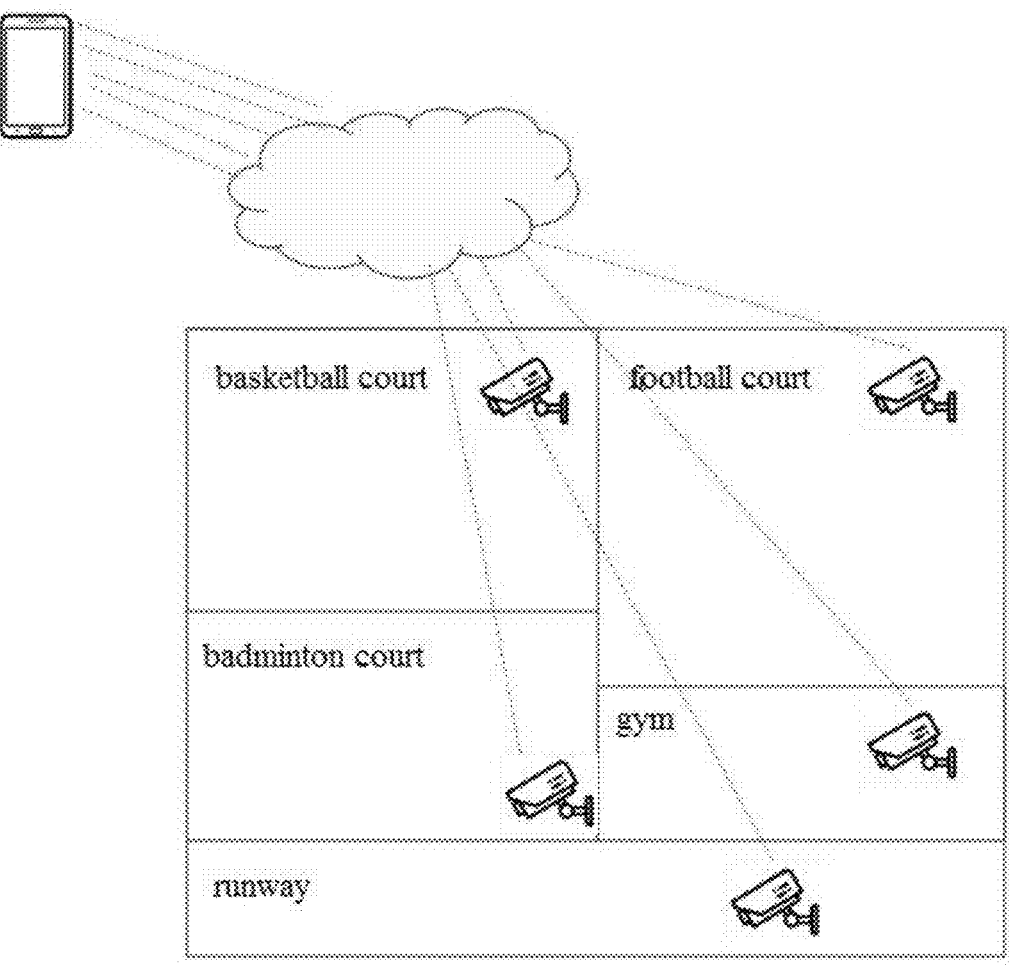
FIG. 3 is an application example of an intelligent community according to an embodiment of the present disclosure.

Taking the intelligent community as an example, FIG. 3 illustrates an application example of an intelligent community. In the scenario of intelligent community, there are also multiple IoT terminal devices, such as cameras, and different cameras monitor different places. When the user desires to know where the child is, if he/she sends a request to different cameras respectively and make determinations, it causes a heavy burden for the user and results in low efficiency.

In view of this, embodiments of the present disclosure provide a method and an apparatus for establishing a connection, a storage medium and a server to solve the problem of quickly establishing connections between a requesting party and one or more target parties so as to rapidly acquire information required by the requesting party.

Figure 4:
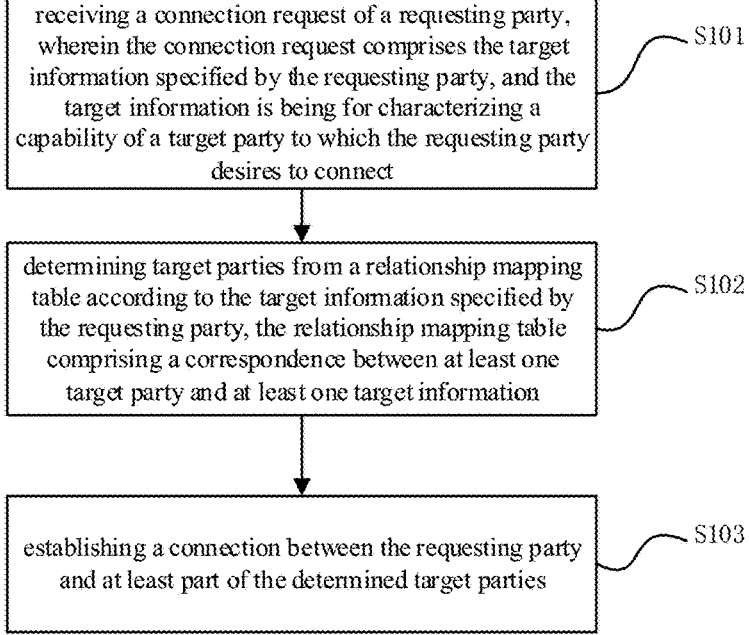
FIG. 4 is a flow chart of a method for establishing a connection according to an embodiment of the present disclosure.

FIG. 4 illustrates a flow chart of a method for establishing a connection. As shown in FIG. 4, this embodiment provides a method for establishing a connection, which may be applied to a server, comprising step S101 to step S103.

At Step S101, a connection request of a requesting party is received, wherein the connection request comprises the target information specified by the requesting party. The target information is used to characterize a capability of a target party to which the requesting party desires to connect.

At Step S102, target parties are determined from a relationship mapping table according to the target information specified by the requesting party, the relationship mapping table comprising a correspondence between at least one target party and at least one target information. It is to be noted that the number of target parties determined may be one or more. In practical applications, the target parties may be terminal devices, APPs or other software modules in the Internet of Things environment such as smart homes and intelligent communities, which are not limited.

At Step S103, a connection between the requesting party and at least part of the determined target parties is established.

In this embodiment, the server receives the connection request of the requesting party that comprises the target information, determines the target party according to the target information and the relationship mapping table, and further establishes connections between the requesting party and at least part of the determined target parties, which realizes determination of one or more target devices by means of the target information carried in the connection request, and then quickly establishes connections between the requesting party and one or more target parties to rapidly acquire information required by the requesting party. The server automatically determines the target party according to the target information carried in the request, which avoids sending a request to different target parties and making determinations by the requesting party, and simplifies the operation of the requesting party, and improves the user's experience. On the other hand, this also avoids such a situation, that is, the server sends the connection request of the requesting party to the target party for processing, but some target parties may be unable to respond to the connection request of the requesting party, so that the target party produces additional consumptions.

In some embodiments, the target information includes type information and/or content information, and the target information does not include identification information of the target party. The type information indicates the type of information the target party can collect, that is, the type of information that can be sent to the server, for example, still images, videos, specific objectives (such as persons, vehicles, items, etc.). The content information indicates the content of information the target party can collect, for example, user A, user B, item C, etc.

In some embodiments, the relationship mapping table is established by the following steps. The steps comprise: acquiring at least one of type information and content information of the at least one target party; in response to acquiring the type information, establishing a relationship mapping table to make the relationship mapping table comprise a correspondence between the at least one target party and the type information; and in response to acquiring the content information, establishing a relationship mapping table to make the relationship mapping table comprise a correspondence between the at least one target party and the content information.

The relationship mapping table may be established prior to step S101, and may also be established after step S101, which is not restricted.

In some embodiments, the target information includes an information label. The information label includes a type label established according to the type information and a content label established according to the content information. The type information indicates the type of information the target party can collect, and the content information indicates the content of information the target party can collect. The requesting party may select the type label or content label as an information label, determine a target party corresponding to the information label, and then establish a connection between the requesting party and the target party so as to perform an operation corresponding to the information label and acquire information collected by the target party.

In some embodiments, when the target information includes an information label, the relationship mapping table is established by the following step. The step comprises: establishing a mapping table between at least one target party and at least one information label as the relationship mapping table. Said determining target parties from a relationship mapping table according to the target information specified by the requesting party (i.e., step S102) may comprise: determining the target party from the mapping table between at least one target party and at least one information label according to the target information specified by the requesting party.

In some cases, said establishing a mapping table between at least one target party and at least one information label may further comprise: acquiring at least one of type information and content information of the at least one target party;

in response to acquiring type information, determining an information label according to the type information;

in response to acquiring content information, determining an information label according to the content information;

based on the determined information label, establishing a mapping table between the at least one target party and the determined information label.

In some embodiments, said acquiring at least one of type information and content information of the at least one target party may comprise: sending an information acquisition request to acquire at least one of type information and content information of the at least one target party; or acquiring at least one of type information and content information reported by the at least one target party during the registration process.

Therefore, the type information and/or content information may be acquired by the server voluntarily based on needs, and may also be directly acquired by being reported during the process of registration of the target party with the server. In practical applications, the target party may report its type information via a service template during the process of registration with the server.

Taking the target party being a terminal device as an example, the type information of the terminal device may be represented by a resources of the terminal device. The resource of a single terminal device may include one or more module resources. Different module resources correspond to different functions, for example, a camera resource (r.camera) includes a media resource (r.media) and a target identification resource (r.object_identification).

The structure of the camera resource (r.camera) is as follows:

| Module name | Module class name | Whether it is required | Description |
|---|---|---|---|
| Media resource | r.media | 1 | value = [1, 2, 3] |
| Target identification resource | r.object_identification | 1 | value = [1, 2, 3] |

The structure of the media resource (r.media) is as follows:

| Value | Interpretation | Description |
|---|---|---|
| 1 | Audio | AAC |
| 2 | video | H.264 |
| 3 | Still image | JPEG |

The structure of the target identification resource (r.object_identification) is as follows:

| Value | Interpretation | Description |
|---|---|---|
| 1 | Person | RTP |
| 2 | Animal | RTP |
| 3 | Item | JPEG |

The server may acquire the resource information of the terminal device by sending an information acquisition request, and then analyze the type information of the terminal device. It may also acquire the resource information reported by the terminal device during the registration process.

The method will be described in detail through the following application examples. It is to be noted that these application examples are just illustrative, rather than restrictive.

Figure 5:
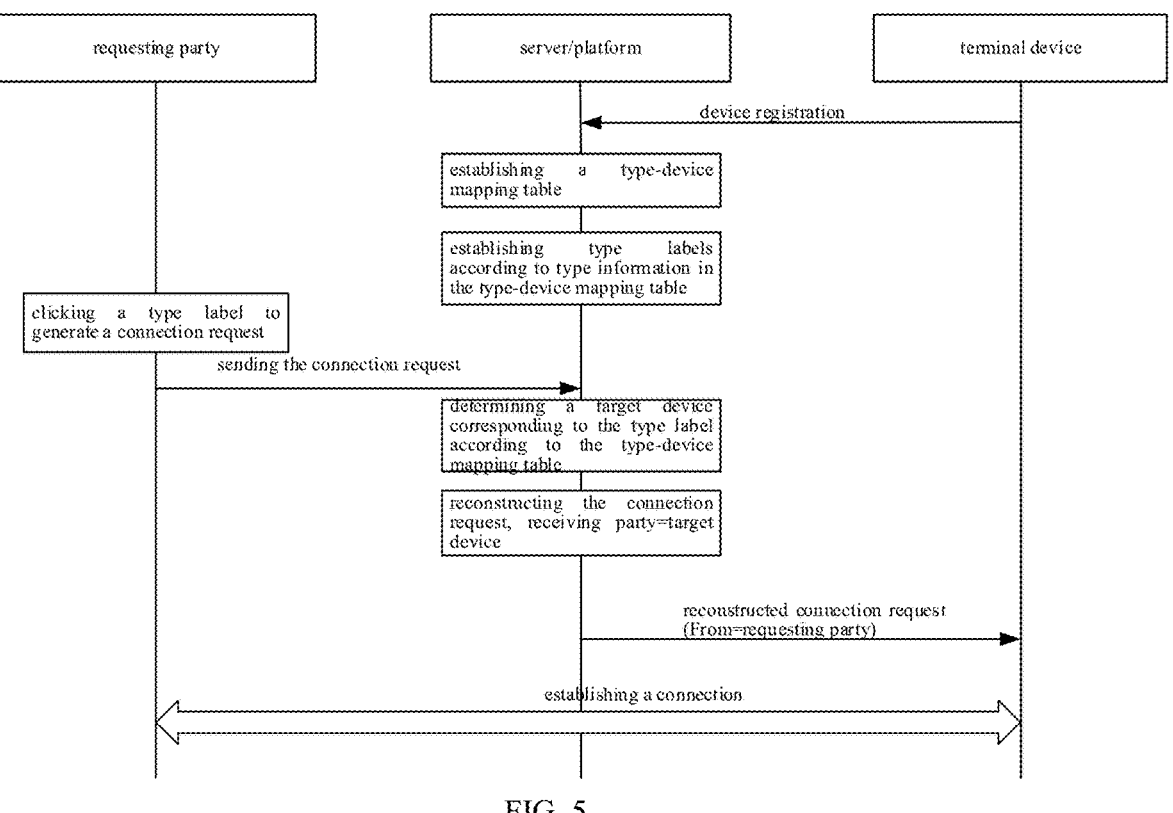
FIG. 5 is a flow chart of a method for establishing a connection in an application example 1 according to an embodiment of the present disclosure.

Application example 1: The target information includes a type label, and the application environment is the smart home environment shown in FIG. 2. FIG. 5 illustrates a flow chart of a method for establishing a connection in said application example, wherein the server may be a cloud server or an edge server. The server may send an acquisition request to acquire type information of a terminal device, or acquire type information reported by the terminal device during the registration process, as shown in Table 1.

TABLE 1

| Device information | Type information | Remarks |
|---|---|---|
| Camera A | Person, animal, item, still image, video | Smart camera |
| Camera B | Person, animal, item, still image, video | Smart camera |
| Camera C | Still image, video | Ordinary camera |
| Camera D | Still image, video | Ordinary camera |
| Camera E | Still image, video | Ordinary camera |

It can be seen that cameras A and B are smart cameras, and the types of information that can be collected include persons, animals, items, still images and videos. Cameras C, D and E are ordinary cameras, and the types of information that can be collected include still images and videos.

The server establishes correspondences between type information and terminal devices according to the type information of the terminal device, i.e., a first mapping table (type-device mapping table), as shown in Table 2.

TABLE 2

| Type information | Device information | Remarks |
|---|---|---|
| Person | Camera A, camera B | |
| Animal | Camera A, camera B | |
| Item | Camera A, camera B | |

TABLE 2-continued

| Type information | Device information | Remarks |
|---|---|---|
| Still image | Camera A, camera B, camera C, camera D, camera E | |
| Video | Camera A, camera B, camera C, camera D, camera E | |

The correspondence between each kind of type information and a terminal device that can collect this kind of type information can be seen from the above table. For example, terminal devices that can collect information of persons, animals and items all include cameras A and B, while terminal devices that can collect still images and videos include cameras A, B, C, D and E.

Figure 6:
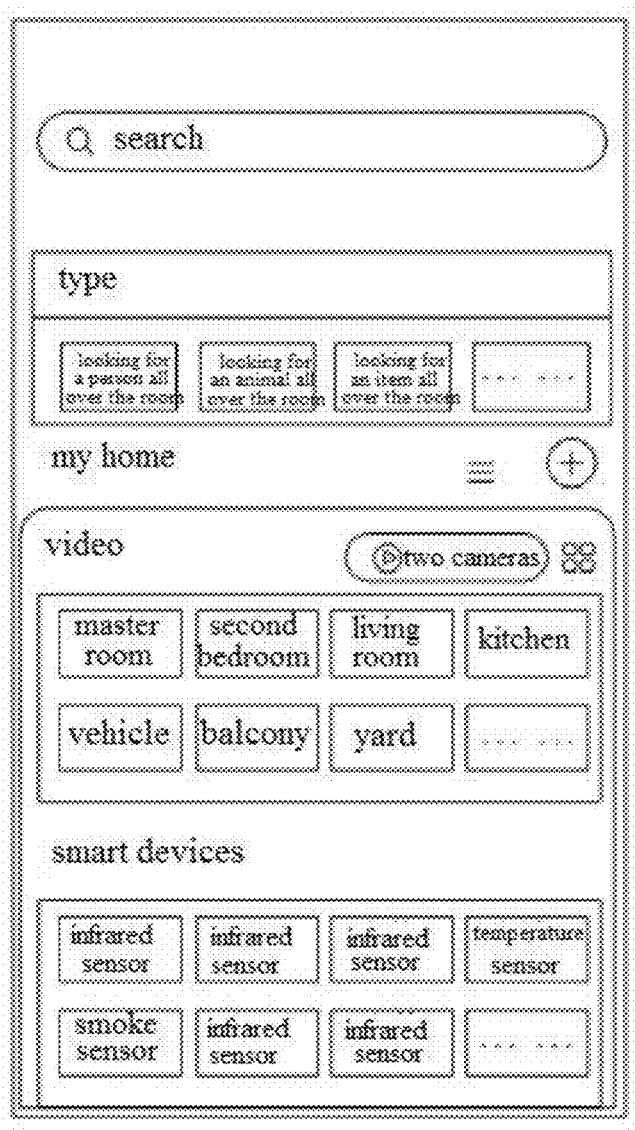
FIG. 6 is a schematic view of a type label in application example 1 according to an embodiment of the present disclosure.

It is possible to establish a type label based on the above type information, and further obtain a mapping table between the terminal device (e.g., target party) and the type label. FIG. 6 shows type labels, including labels of looking for a person all over the room, looking for an animal all over the room, looking for an item all over the room, etc.

In practical applications, the requesting party selects the type label in an APP by operations such as clicking to generate a connection request, which includes From=requesting party, receiving party=server/platform, content=type label. The server/platform receives the connection request sent by the requesting party, and determines a target party corresponding to the type label selected by the requesting party according to the first mapping table (type-device mapping table).

The target party determined in this application example can only comprise one terminal device, and the target information in the connection request does not comprise the identification information of the target party. At that time, said establishing connections between the requesting party and at least part of determined target parties (step S103) may comprise:

reconstructing the connection request, so that a reconstructed connection request comprises identification information of the terminal device;

sending the reconstructed connection request to the terminal device to establish a connection between the requesting party and the terminal device.

The server/platform in this application example establishes the first mapping table (type-device mapping table) according to the type information of the terminal device, and generates the type label according to the type information in the type-device mapping table. The user generates a connection request by selecting the type label based on needs, and rapidly determines a connectable target party, so as to quickly establish a connection and acquire corresponding information. It can be understood that in practical applications, it is also possible to not generate the information label while only establish the first mapping table. The user selects type information based on needs to generate a connection request, and the server determines the target party according to the type information included in the connection request, and establishes a connection between the requesting party and the target party.

Figure 7:
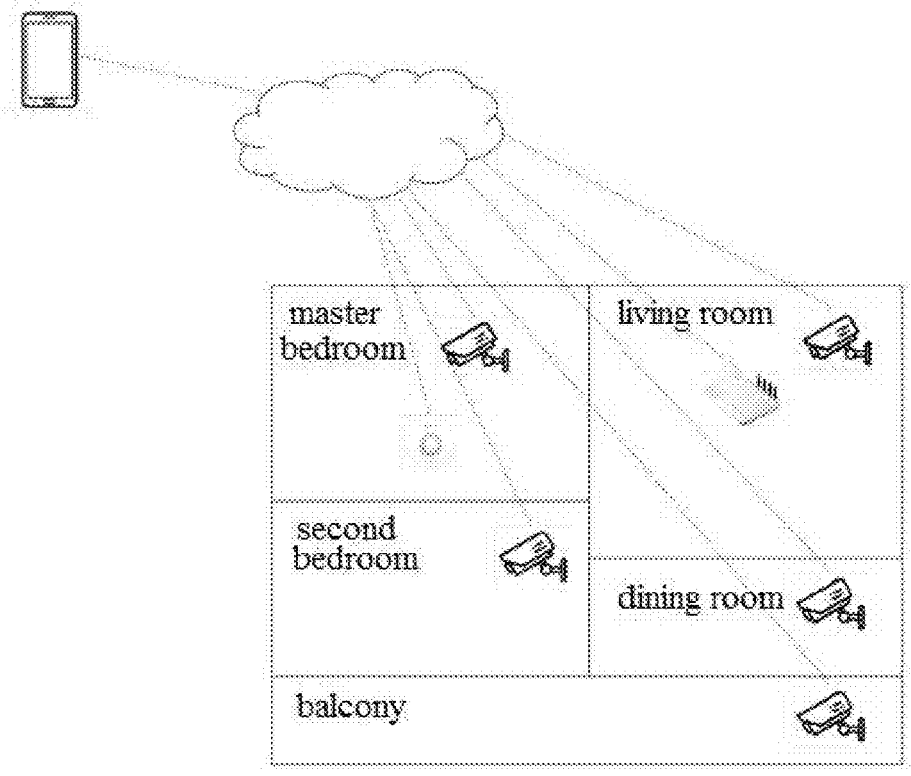
FIG. 7 is an application environment of an application example 2 according to an embodiment of the present disclosure.
Figure 8:
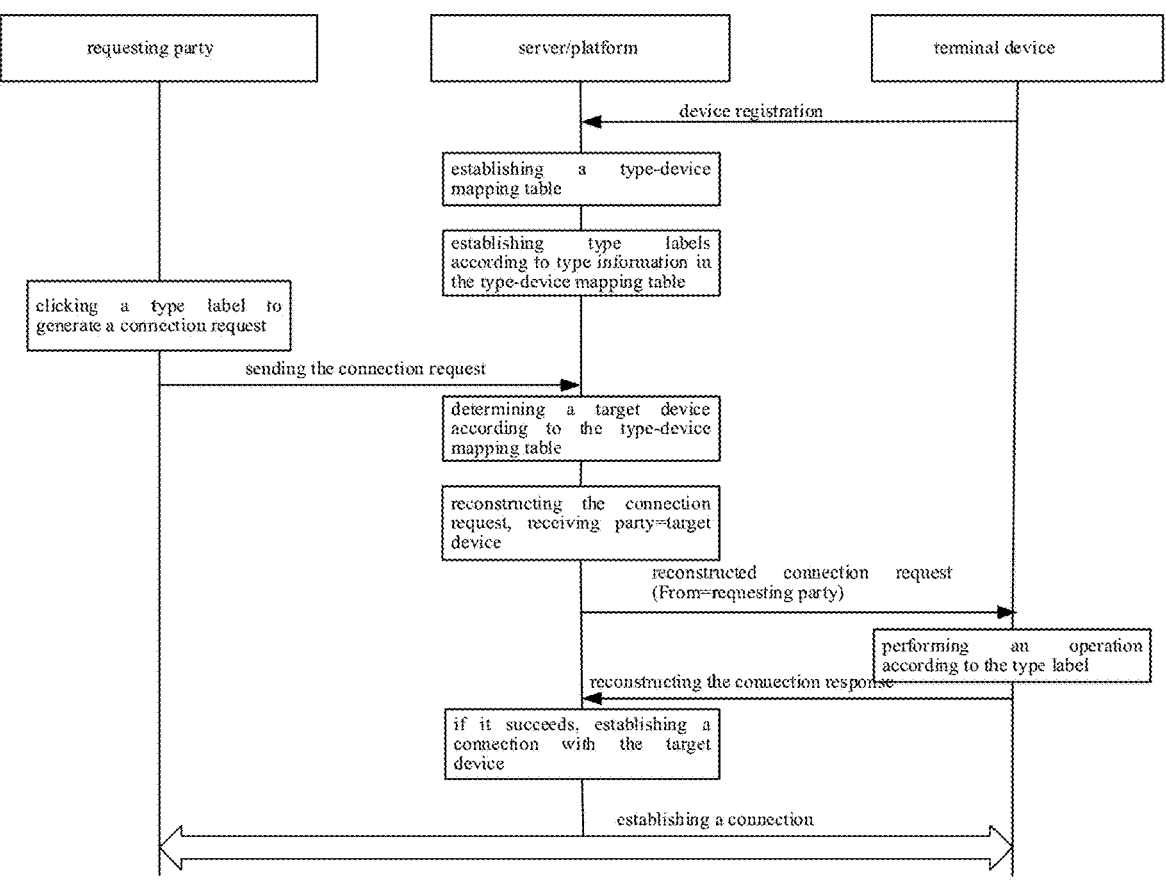
FIG. 8 is a flow chart of a method for establishing a connection in application example 2 according to an embodiment of the present disclosure.

Application example 2: The information label includes a type label, and the application environment is an application environment shown in FIG. 7. The target party comprises various types of terminal devices (including cameras, infrared sensors, and edge gateways). FIG. 8 illustrates a flow chart of a method for establishing a connection. The server may send an acquisition request to acquire type information of a terminal device, or acquire type information reported by the terminal device during the registration process, as shown in Table 3.

TABLE 3

| Device type | Type information | Remarks |
|---|---|---|
| Camera A | Person, animal, item, vehicle, still image, video | Smart camera |
| Camera B | Person, animal, item, vehicle, still image, video | Smart camera |
| Camera C | Person, animal, item, vehicle, still image, video | Smart camera |
| Camera D | Still image, video | Ordinary camera |
| Camera E | Still image, video | Ordinary camera |
| Infrared sensor | Person | Human body sensing |
| Edge gateway | Human track, animal track, vehicle track . . . | Intelligent gateway |

It can be seen that cameras A, B, and C are smart cameras, and the types of information that can be collected include persons, animals, items, vehicles, still images and videos. Cameras D and E are ordinary cameras, S and the types of information that can be collected include still images and videos. The type of information that can be collected by the infrared sensor is persons. The types of information that can be collected by the edge gateway include human track, animal track, vehicle track, etc. According to the type information of the terminal device, the server establishes a first mapping table (device capability mapping table) between the type information and the terminal device, as shown in Table 4.

TABLE 4

| Type information | Device information | Remarks |
|---|---|---|
| Person | Camera A, camera B, camera C, infrared sensor | |
| Animal | Camera A, camera B, camera C | |
| Item | Camera A, camera B, camera C | |
| Vehicle | Camera A, camera B, camera C | |
| Still image | Camera A, camera B, camera C, camera D, camera E | |
| Video | Camera A, camera B, camera C, camera D, camera E | |
| Human track | Edge gateway | |
| Animal track | Edge gateway | |
| Vehicle track | Edge gateway | |

The correspondence between each kind of type information and terminal devices that can collect this kind of type information can be seen from the above table. Terminal devices that can collect information of animals, items and vehicles all comprise cameras A, B and C. Terminal devices that can collect information of persons comprise cameras A, B, C and infrared sensors. Terminal devices that can collect information of still images and videos include cameras A, B, C, D and E. Terminal devices that can collect information of human track, animal track and vehicle track include edge gateways.

Figure 9:
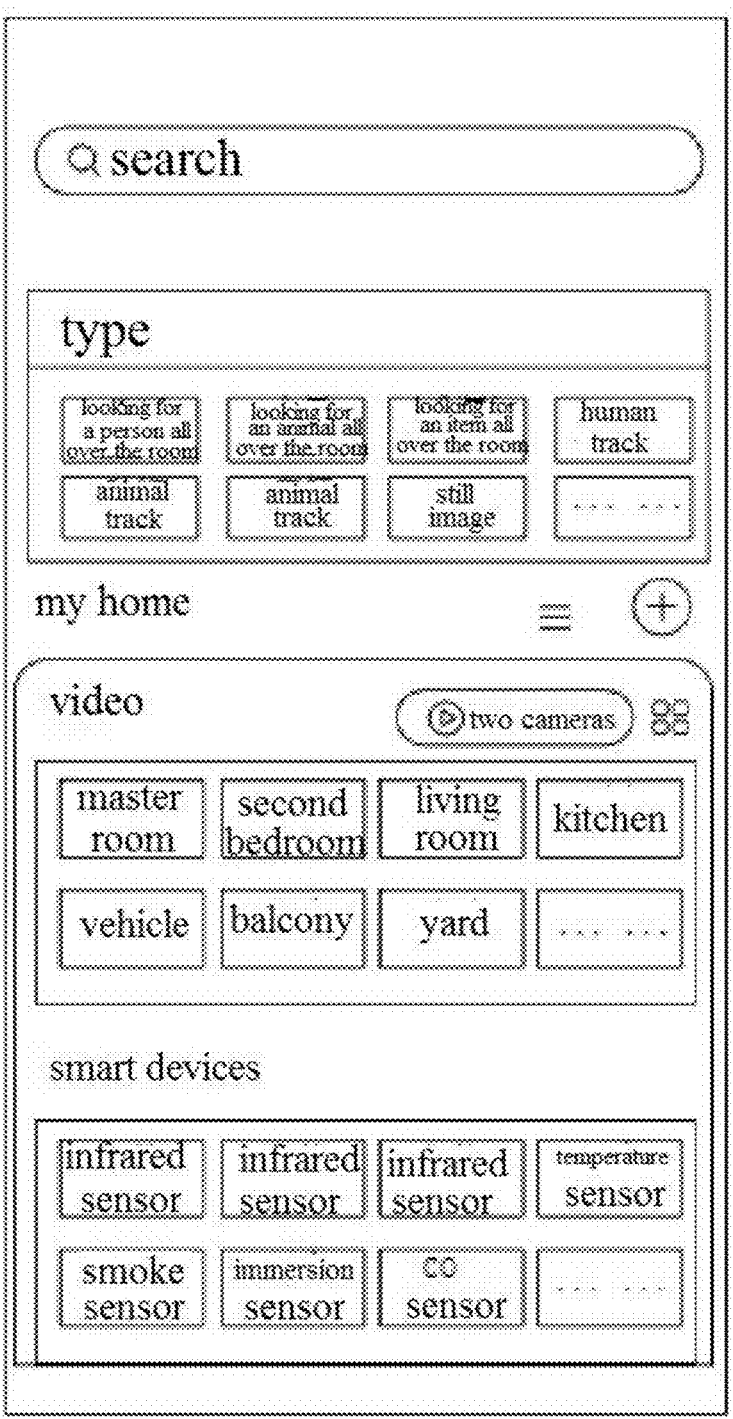
FIG. 9 is a schematic view of a type label in application example 2 according to an embodiment of the present disclosure.

It is possible to establish a type label based on the above first mapping table (e.g., type information therein), and further obtain a mapping table between the terminal device and the type label. The type labels shown in FIG. 9 include labels of looking for a person all over the room, looking for an animal all over the room, looking for an item all over the room, human track, animal track, vehicle track, still images, etc. The construction of the type label may refer to the type information in the first mapping table. It is possible to directly use the type information as a type label, and it is also possible to construct a type label in conjunction with other information, for example, constructing a type label based on information of the knowledge graph and the type information. The knowledge graph can describe the relationships between type information. Therefore, the type label constructed by combining the knowledge graph with the type information contains more information, and the user selection has higher accuracy, for example, labels of looking for a person in a living room, looking for a person in the kitchen, etc.

In practical applications, the requesting party selects the type label in an APP by operations such as clicking to generate a connection request, which includes From=requesting party, receiving party=server/platform, content=type label. The server/platform receives the connection request sent by the requesting party, and determines a terminal device corresponding to the type label selected by the requesting party according to the first mapping table (type-device mapping table).

In the case that the target party comprises multiple terminal devices (such as various types of terminal devices), said establishing connections between the requesting party and at least part of determined target parties (step S103) may comprise:

reconstructing the connection request so that the reconstructed connection request comprises identification information of the multiple terminal devices;

sending the reconstructed connection request to the multiple terminal devices to enable the multiple terminal devices to perform an operation according to the target information;

acquiring response information sent by the multiple terminal devices for the reconstructed connection request, wherein the response information comprises a result of performing an operation by each terminal device of the multiple terminal devices according to the target information, the result indicating whether said each terminal device performs the operation successfully or not;

establishing a connection between the requesting party and a terminal device of the multiple terminal devices with the result in the response information being success.

Specifically, the reconstructed connection request includes: From=requesting party, receiving party=multiple terminal devices.

Under some circumstances, sending the reconstructed connection request to multiple terminal devices may comprise: sending the reconstructed connection request to multiple terminal devices simultaneously or sequentially.

It can be understood that the result being success indicates that the terminal device can perform an operation to which the target information (including the type label in this example) corresponds, enabling the requesting party to acquire corresponding information. The result being non-success indicates that the terminal device cannot perform an operation to which the target information corresponds, so that the requesting party cannot acquire corresponding information via the terminal device.

The server/platform in this example establishes the first mapping table (type-device mapping table) according to the type information and generates a type label. The requesting party generates a connection request by selecting the type label. The server/platform determines a terminal device according to the type label carried in the connection request, and sends the connection request to the target party to establish a connection with a terminal device which responds successfully, thereby establishing a connection between a valid target party (terminal device) and the requesting party. This avoids establishing a connection between a terminal device that cannot normally perform an operation and the requesting party, which not only effectively meets the need of the requesting party to acquire information and simplifies the operation of the requesting party, but also avoids waste of the resource of the terminal device that cannot normally perform an operation, and improves the efficiency of the terminal device. In addition, by reasonably allocating the target parties (such as terminal devices) for the requesting party, the probability of successfully responding to the user's connection request is the highest.

Figure 10:
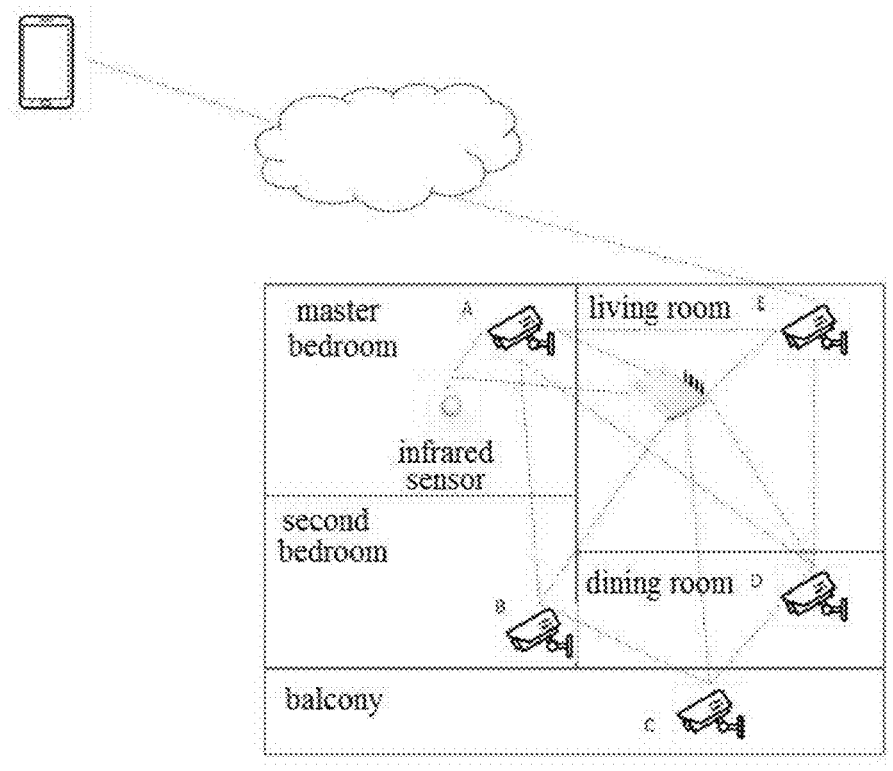
FIG. 10 is an application environment of an application example 3 according to an embodiment of the present disclosure.
Figure 11:
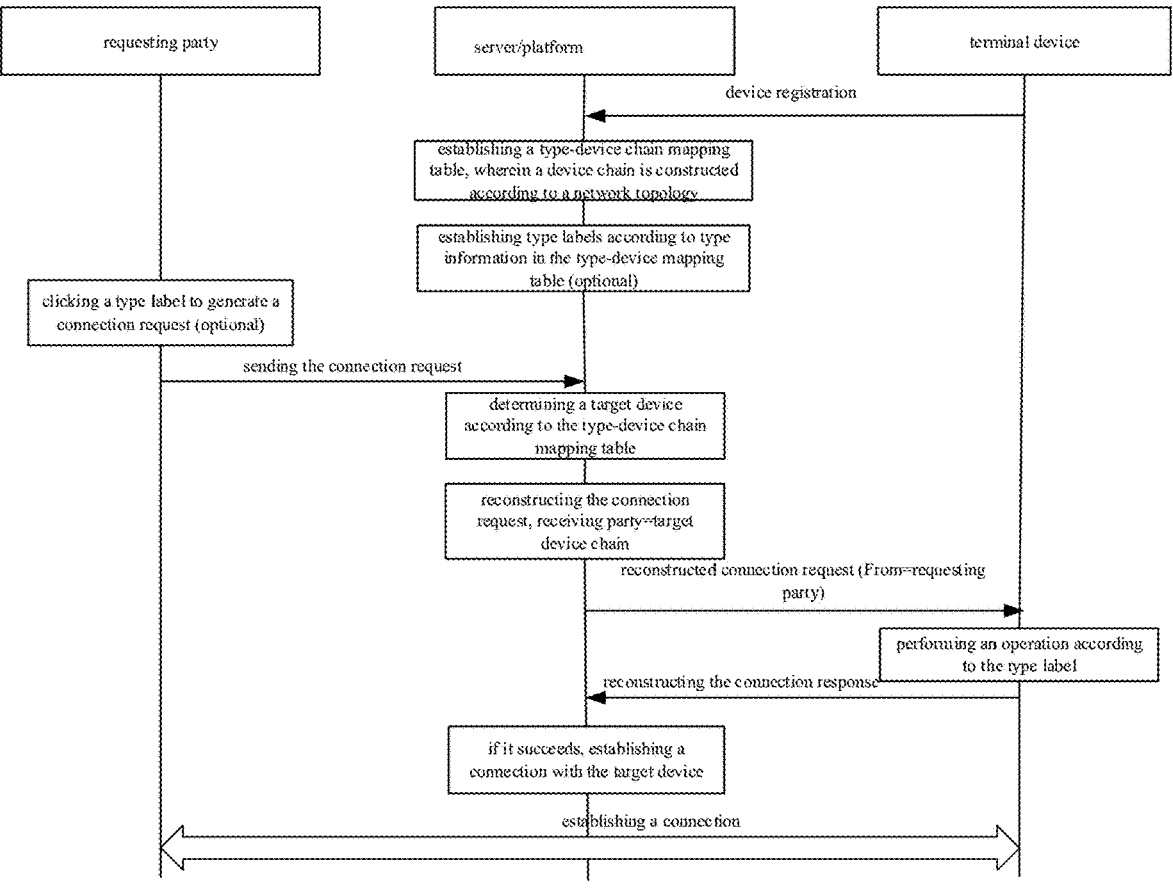
FIG. 11 is a flow chart of a method for establishing a connection in application example 3 according to an embodiment of the present disclosure.

Application instance 3: The target information includes a type label, and the application environment is an application environment shown in FIG. 10, which comprises a device chain (including cameras, infrared sensors, and edge gateways) composed of at least one terminal device. The device chain is a combination of target parties with connection relationships built according to a network topology structure, and the devices in the device chain can be connected via one or more network protocols. For example, the edge gateway is connected to the camera via the IP protocol, and the edge gateway is connected to the infrared sensor via the ZigBee protocol. FIG. 11 illustrates a flow chart of a method for establishing a connection. The server may send an acquisition request to acquire type information of a terminal device, or acquire type information reported by the terminal device during the registration process. The type information is as shown in Table 3. According to the type information of the terminal device, the server establishes mapping relationships between the type information and the terminal devices as shown in Table 4. In the case of this application example, when the requesting party selects the information label, the target party determined according to the first mapping table may be one or more.

In the case that one or more target parties form a device chain, said establishing connections between the requesting party and at least of determined target parties (step S103) comprises:

reconstructing the connection request, the reconstructed connection request comprising identification information of a target party at a chain head of the device chain;
  sending the reconstructed connection request to the target party at the chain head of the device chain to establish connections between the requesting party and at least part of determined target parties.

The mapping relationships between the type information and the device chains are shown in Table 5:

TABLE 5

| Type information | Device chain | Remarks |
|---|---|---|
| Person | 1. camera A –> camera B –> camera C (e.g. networking via Bluetooth) 2. camera A –> infrared sensor | |
| Animal | 1. camera A –> camera B –> camera C (e.g. networking via Bluetooth) | |
| Item | 1. camera A –> camera B –> camera C (e.g. networking via Bluetooth) | |
| Vehicle | 1. camera A –> camera B –> camera C (e.g. networking via Bluetooth) | |
| Still image | 1. camera A –> camera B –> camera C –> camera D –> camera E | |
| Video | 1. camera A –> camera B –> camera C –> camera D –> camera E | |

TABLE 5-continued

| Type information | Device chain | Remarks |
|---|---|---|
| Human track | 1. edge gateway | |
| Animal track | 1. edge gateway | |
| Vehicle track | 1. edge gateway | |

In one situation, after sending the reconstructed connection request to the target party at the chain head of the device chain, it may further comprise: acquiring first response information sent by the target party at the chain head for the reconstructed connection request.

In the case that the first response information is success, a connection between the requesting party and the target party at the chain head is established. The first response information comprises a result of performing an operation by the target party at the chain head according to the target information, the result indicating whether the target party at the chain head performs the operation successfully or not.

In the case that the first response information is non-success, second response information of a target party connected to the target party at the chain head in the device chain for the reconstructed connection request is acquired. The second response information comprises a result of performing an operation by a connected target party according to the target information, the result indicating whether the connected target party performs said operation successfully or not. In the case that the second response information is success, a connection between the requesting party and the target party connected to the target party at the chain head in the device chain is established.

In another situation, after sending the reconstructed connection request to the target party at the chain head of the device chain, it may further comprise: acquiring third response information sent by a target party at a chain tail of the device chain. The third response information comprises a result of performing an operation by the target party at the chain tail according to the target information, the result indicating whether the target party at the chain tail performs the operation successfully or not.

In the case that the third response information is success, a connection between the requesting party and the target party at the chain tail of the device chain is established.

In the case that the third response information is non-success, the unsuccessful response is returned to the requesting party.

By constructing the device chain, the number of connections between the server and the target parties (terminal devices) decreases significantly, because the server only needs to send the connection request to a chain head device of the device chain. If the chain head device executes the connection request unsuccessfully, the chain head device can automatically send the connection request to the next device corresponding to the chain head device. This process does not require the server to participate, so the load of the server can be reduced. Specifically, the chain head device can send the connection request via a network protocol with the next device in the device chain, such as via IP protocol, Bluetooth protocol, etc.

In some implementations, when the determined target parties are multiple in number and form multiple device chains, said establishing connections between the requesting party and at least part of determined target parties (step S103) may comprise steps of:

selecting a device chain from the multiple device chains according to a preset rule;

reconstructing the connection request, wherein the reconstructed connection request comprises identification information of a target party at a chain head of a selected device chain;

sending a reconstructed connection request to the target party at the chain head of the selected device chain to enable the target party in the selected device chain to perform an operation according to the target information;

acquiring response information sent by the target party in the selected device chain for the reconstructed connection request, the response information comprising a result of performing an operation by the target party in the selected device chain according to the target information, the result indicating whether the target party in the selected device chain performs the operation successfully;

establishing a connection between the requesting party and a target party in the selected device chain whose result of the response information is success.

The preset rule comprises one or more of the following:

Rule 1: Select the longest device chain of multiple device chains. By preferably selecting a device chain with the longest device chain, the probability of determining the terminal device that is to establish a connection with the requesting party can be increased.

Rule 2: Select a device chain of multiple device chains which employs a preset networking mode. The preset mode includes MESH networking, star networking and other networking modes. In practical applications, Rule 2 may be selecting a device chain of multiple device chains which employs the MESH networking. Since there is no individual failure in the MESH networking mode, and on the contrary, the star networking is prone to individual failure, the MESH networking mode can rapidly and efficiently select a device chain that can perform an operation corresponding to the target information, and further determine a terminal device therein that can establish a connection with the requesting party, which can avoid a decrease in the connection efficiency due to generation of additional consumptions.

Rule 3: Select a device chain of multiple device chains with the target party at the chain head having the best processing capacity. If the target party at the chain head has strong processing capacity, it can process the connection request faster, so that a device chain that can perform an operation corresponding to the target information can be selected rapidly and efficiently, and a terminal device therein that can establish a connection with the requesting party can be further determined, which can avoid a decrease in the connection efficiency due to generation of additional consumptions. It can be understood that the processing capacity of the terminal device can be determined according to the model, performance parameters or other indicators of the device.

Figures 12, 13:
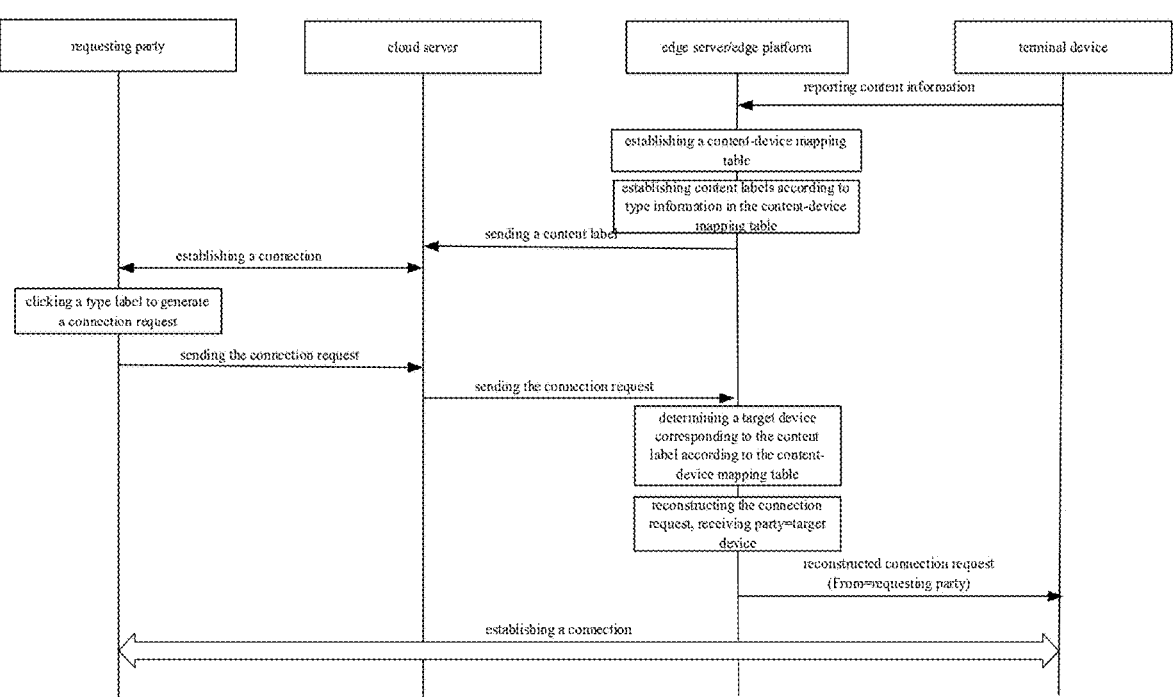
FIG. 12 is a flow chart of a method for establishing a connection in an application example 4 according to an embodiment of the present disclosure.
FIG. 13 is a schematic view of a content label in application example 4 according to an embodiment of the present disclosure.

Application example 4: The target information includes a content label, and the application environment is a smart home environment. FIG. 12 illustrates a flow chart of a method for establishing a connection. Since content information collected by the terminal device is involved, uploading the content information to the cloud server may lead to the leakage of privacy information. Therefore, at the time of establishing a connection between the requesting party and the target party based on the content label, the server comprises an edge server and a cloud server. In one situation, the cloud server is only responsible for receiving the connection request and forwarding it to the edge server. The edge server determines one or more target parties based on the content label in the connection request. In another situation, the cloud server saves the content label, receives the connection request, and selects an appropriate edge server according to the content label. The edge server establishes a mapping table, and determines one or more target parties according to the target information included in the connection request. This can not only effectively protect privacy, but also efficiently establish a connection between the requesting party and the target party according to the content label carried in the connection request so as to acquire data required by the requesting party. The edge server/platform can acquire content information collected by the terminal device, as shown in Table 6.

TABLE 6

| Device type | Content information | Remarks |
| --- | --- | --- |
| Camera A | Family member A, family member B, family member C | Bedroom camera |
| Camera B | Family member A, family member B, family member C | Living room camera |
| Camera C | Family member A, family member B, item A, item B | Kitchen camera |
| Camera D | Family member A, family member B, family member C, item C, item D | Balcony camera |
| Camera E | Family member A, family member B, family member C, item E, item F | Garden camera |

It can be seen that the content information that cameras A and B can collect include family member A, family member B and family member C, the content information that camera C can collect includes family member A, family member B, item A and item B, the content information that camera D can collect includes family member A, family member B, family member C, item C and item D, and the content information that camera E can collect includes family member A, family member B, family member C, item E and item F. The edge server/edge platform establishes correspondences between the content information and the terminal devices according to the content information of the terminal device, i.e., a second mapping table (content-device mapping table), as shown in Table 7.

TABLE 7

| Content information | Device information | Remarks |
| --- | --- | --- |
| Family member A | Camera A, camera B, camera C, camera D, camera E | |
| Family member B | Camera A, camera B, camera C, camera D, camera E | |
| Family member C | Camera A, camera B, camera D, camera E | |
| Item C | Camera D | |
| Item D | Camera D | |
| Item E | Camera E | |
| Item F | Camera E | |

The correspondence between each kind of content information and terminal devices that can collect this kind of content information can be seen from the above table. The terminal devices that can collect information of family member A and family member B all comprise cameras A, B, C, D, E, the terminal device that can collect information of is family member C comprises cameras A, B, D, E, the terminal devices that can collect information of item C and item D both comprise camera D, and terminal devices that can collect information of item E and item F comprise camera E.

The edge server/edge platform can establish content labels based on the above second mapping table (for example, content information), and further obtain a mapping table between the terminal devices and the content labels. The content labels shown in FIG. 13 include family member A, family member B, family member C, item C, item D, item E, item F, etc., and the content labels are sent to the cloud server.

In practical applications, the requesting party selects a content label via the cloud server to generate a connection request, which includes From=requesting party, receiving party=cloud server/platform, content=content label. The cloud server/platform receives the connection request sent by the requesting party, reconstructs the connection request as a connection request that includes From=requesting party, receiving party=edge server/platform, content=content label, and sends it to the edge server/edge platform. According to the second mapping table (content-device mapping table), a target party corresponding to the content label selected by the requesting party is determined.

Similar to application example 1, it is possible to remove the content label, reconstruct the connection request by taking the target party as the receiving party to make the reconstructed connection request comprise an identification of the target party, and further establish a connection between the requesting party and the target party. Therefore, in this application example, said establishing connections between the requesting party and at least part of determined target parties (step S103) may comprise steps of:

reconstructing the connection request, the reconstructed connection request comprising identification information of the terminal device. Specifically, the reconstructed connection request includes: From=requesting party, receiving party=target party, which removes the content label;

sending the reconstructed connection request to the terminal device to establish a connection between the requesting party and the terminal device.

The server/platform in this application example establishes a second mapping table (content-device mapping table) according to the content information, and generates a content label according to the content information. The user generates a connection request by selecting the content label based on needs, and rapidly determines a connectable target party, so as to quickly establish a connection and acquire corresponding information. It can be understood that in practical applications, it is also possible to not generate the information label while only establish the second mapping table. The user selects content information based on needs and generates a connection request. According to the content information included in the connection request, the server determines the target party, and establishes a connection between the requesting party and the target party. The construction of the content label may refer to the content information in the second mapping table. It is possible to directly use the content information as a content label, and it is also possible to construct a content label in conjunction with other information, for example, constructing a content label based on information of the knowledge graph and the content information. The knowledge graph can describe the relationships between content information. Therefore, the content label constructed by combining the knowledge graph with the content information contains more information, and the user selection has higher accuracy, for example, looking for family member A in a living room, looking for family member B in the kitchen, etc.

Figure 14:
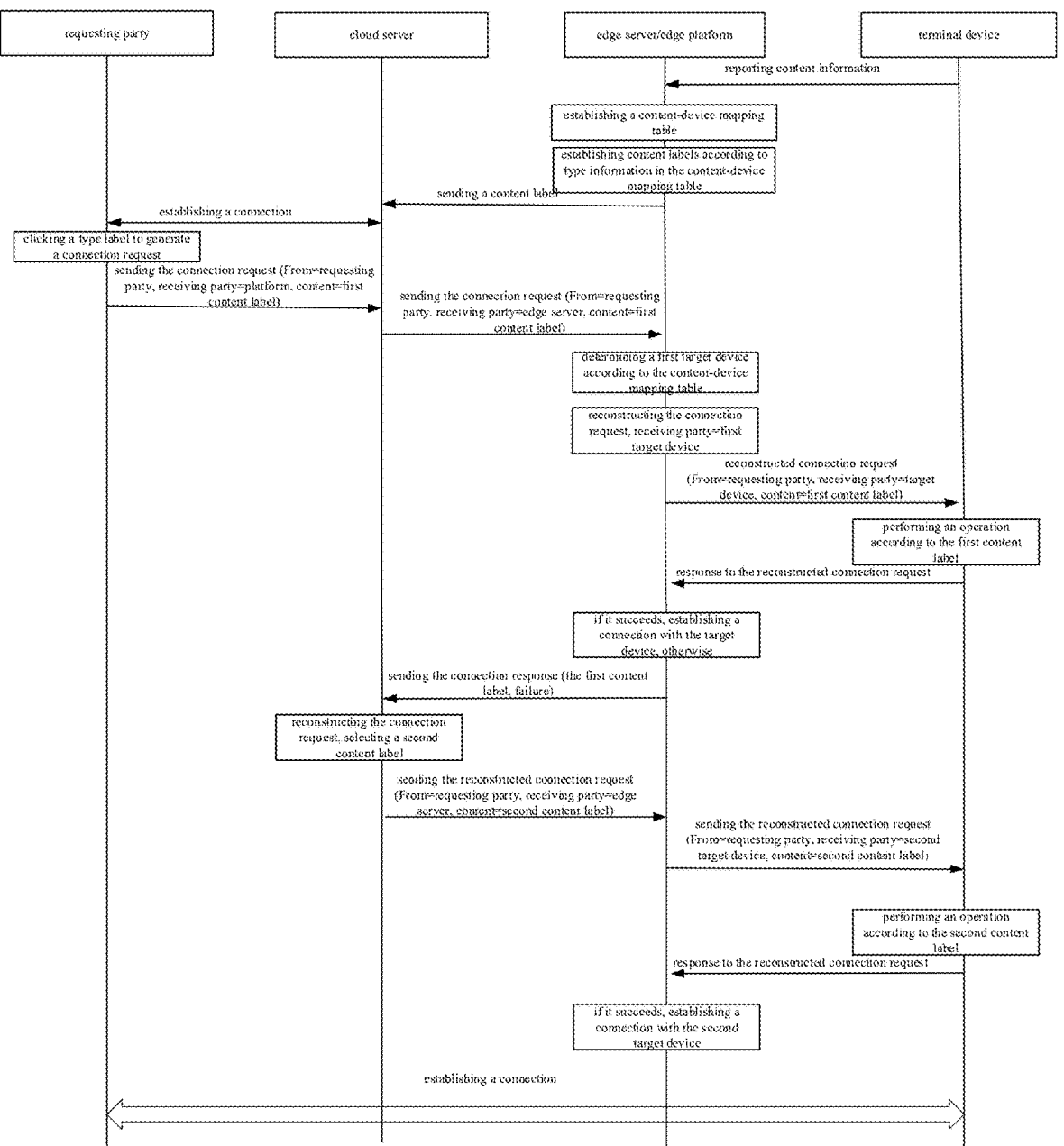
FIG. 14 is a flow chart of a method for establishing a connection in an application example 5 according to an embodiment of the present disclosure.

Application example 5: The target information is an information label, and includes a first content label. The application environment is a smart home environment shown in FIG. 7. FIG. 14 illustrates a flow chart of a method for establishing a connection. The content information of terminal devices acquired by the server is shown in Table. 8.

TABLE 8

| Device type | Collected content information | Remarks |
|---|---|---|
| Camera A | Family member A, family member B, family member C, animal A, animal B, item A, vehicle A | Smart camera |
| Camera B | Family member A, family member B, family member C, animal A, animal B, item B, vehicle A | Smart camera |
| Camera C | Person, animal, item, vehicle | Smart camera |
| Camera D | Person, animal, item, vehicle | Smart camera |
| Camera E | Person, animal, item, vehicle | Smart camera |
| Infrared sensor | Person | Human body sensing |
| Edge gateway | Family member A, family member B, family member C, family member A track, family member B track, family member C track, animal A track, animal B track | Intelligent gateway |

The edge server/edge platform establishes a second mapping table of mapping relationships between content information and terminal devices according to the content information of the terminal devices, as shown in Table 9.

TABLE 9

| Content information | Device information | Remarks |
|---|---|---|
| Family member A | Camera A, camera B, edge gateway | |
| Family member B | Camera A, camera B, edge gateway | |
| Family member C | Camera A, camera B, edge gateway | |
| Animal A | Camera A, camera B, edge gateway | |
| Animal B | Camera A, camera B, edge gateway | |
| Item A | Camera A, camera B, edge gateway | |
| Item B | Camera A, camera B, edge gateway | |
| Person | Camera C, camera D, camera E, infrared sensor | |
| Animal | Camera C, camera D, camera E, infrared sensor | |
| Item | Camera C, camera D, camera E, infrared sensor | |
| Vehicle | Camera C, camera D, camera E, infrared sensor | |
| Family member A track | Edge gateway | |
| Family member B track | Edge gateway | |
| Family member C track | Edge gateway | |
| Animal A track | Edge gateway | |
| Animal A track | Edge gateway | |

The edge server/edge platform establishes content labels (as shown in FIG. 13) according to information (i.e., content information) of the second mapping table, for example, labels of family member A, family member B, family member C, animal A, animal B, item A, etc., thereby obtaining a mapping table between the terminal devices and the content labels. The edge server/edge platform sends the content labels to the cloud server.

In practical applications, the requesting party selects the first content label via the cloud server to generate a connection request, which includes From=requesting party, receiving party=cloud server/platform, content=first content label. The cloud server/platform receives the connection request sent by the requesting party, reconstructs the connection request as a connection request that includes From=requesting party, receiving party=edge server/platform, content=first content label, and sends it to the edge server/edge platform. The edge server/edge platform then determines a target party corresponding to the first content label selected by the requesting party according to the second mapping table.

Further, when the information label is the first content label, said determining the target party from the mapping table between at the least one target party and at least one information label according to the target information specified by the requesting party (i.e., step S102) may comprise:

> determining a first target party from the mapping table between at least one target party and at least information label according to the first content label. It can be understood that the first target party may comprise one more terminal devices.

In practical applications, there may be the case that it is impossible for the first target party determined according to the first content label to perform an operation corresponding to the first content label. Therefore, said establishing connections between the requesting party and at least part of determined target parties (step S103) may comprise S103-f1-S103-f9.

Step S103-f1, reconstruct the connection request, the reconstructed connection request comprising identification information of the first target party. The reconstructed connection request includes: From=requesting party, receiving party=first target party, content=first content label.

Step S103-f2, send the reconstructed connection request to the first target party to enable the first target party to perform an operation according to the first content label, for example, determining whether family member A has been detected.

Step S103-f3, acquire response information sent by the first target party, the response information comprising a result of performing an operation by the first target party according to the first content label. The result indicates whether the first target party performs the operation successfully or not.

Step S103-f4, in response to the result being non-success, determine a second content label associated with the first content label, wherein a range of content information of the second content label is larger than a range of content information of the first content label. In addition, the first content label and the second content label should be associated with each other. Specifically, the second content label may be the generic concept of the first content label. For example, family member A is taken as the first content label and person is taken as the second content label. It can be understood that if the result is success, a connection is established between the requesting party and the first target party in response to the result being success. By taking the second content label as the target information, the probability of successfully responding to the connection request of the requesting party can be effectively increased. Connection failure will not be returned because of unsuccessfully responding to the connection request including the first content label, which improves the user experience. The first content labels and the second content labels are as shown in Table 10.

| Content information | Device information | Remarks |
|---|---|---|
| Family member A | Camera A, camera B, edge gateway | can be used |
| Family member B | Camera A, camera B, edge gateway | as the first |
| Family member C | Camera A, camera B, edge gateway | content |
| Animal A | Camera A, camera B, edge gateway | labels |
| Animal B | Camera A, camera B, edge gateway | |
| Item A | Camera A, camera B, edge gateway | |
| Item B | Camera A, camera B, edge gateway | |
| Person | Camera C, camera D, camera E, infrared sensor | can be used as the |
| Animal | Camera C, camera D, camera E, infrared sensor | second content |
| Item | Camera C, camera D, camera E, infrared sensor | labels |
| Vehicle | Camera C, camera D, camera E, infrared sensor | |
| Family member A track | Edge gateway | can be used |
| Family member B track | Edge gateway | as the first |
| Family member C track | Edge gateway | content labels |
| Animal A track | Edge gateway | |
| Animal A track | Edge gateway | |

Step S103-f5, determine a second target party from the mapping table between at least one target party and at least information label according to the second content label.

Step S103-f6, re-reconstruct a content request, the re-reconstructed connection request comprising identification information of the second target party.

In practical applications, after step S103-f3, the edge server may send the acquired response information to the cloud server, and the cloud server determines a second content label and re-reconstructs the connection request based on the second content label and the second target party. The edge server can also determine a second content label, and re-reconstruct the connection request based on the second content label and the second target party.

Step S103-f7, send the re-reconstructed connection request to the second target party to enable the second target party to perform an operation according to the second content label.

Step S103-f8, acquire response information sent by the second target party, the response information comprising a result of performing an operation by the second target party according to the second content label. The result indicates whether the second target party performs the operation successfully or not.

Step S103-f9, establish a connection between the requesting party and a second target party with the result being success. It can be understood that if the result is non-success, the connection will not be established.

In this application example, the edge server establishes a content-device mapping table according to the content information, and generates a content label according to the content information. The requesting party selects the content label to generate a connection request. The edge server determines the first target party according to the content label carried in the connection request, and sends the connection request to the first target party. When the first target party responds unsuccessfully, the edge server or cloud server reconstructs the connection request (generalizing the content information in the connection request), determines a second content label after the content information has been generalized, and further determines a corresponding second target party. The reconstructed connection request is sent to the second target party, and after the second target party responds successfully, a connection between the requesting party and the second target party will be established.

Application example 6: The target information is an information label and includes a content label. The application environment is an application environment shown in FIG. 10, which comprises a device chain (including cameras, infrared sensors, and edge gateways) composed of at least one terminal device. The device chain is a combination of target parties with connection relationships built according to a network topology structure. The content information of the terminal devices acquired by the server is shown in Table 8. According to the content information of the terminal devices, the edge server/edge platform establishes mapping relationships (i.e., second mapping table) between the content information and the terminal devices, as shown in Table 11. By constructing the device chain, the number of connections between the server and the target parties (terminal devices) decreases significantly, because the server only needs to send the connection request to a chain head device of the device chain. If the chain head device executes the connection request unsuccessfully, the chain head device can automatically send the connection request to the next device corresponding to the chain head device. This process does not require the server to participate, so the load of the server can be reduced. Specifically, the chain head device can send the connection request via a network protocol with the next device in the device chain, such as via IP protocol, Bluetooth protocol, etc.

TABLE 11

| Content information | Device information | Remarks |
|---|---|---|
| Family member A | 1. edge gateway –> camera A (for example, IP network connection)<br>2. edge gateway –> camera B (for example, IP network connection)<br>3. camera A –> camera B (for example, Bluetooth network connection) | |
| Family member B | 1. edge gateway –> camera A (for example, IP network connection)<br>2. edge gateway –> camera B (for example, IP network connection)<br>3. camera A –> camera B (for example, Bluetooth network connection) | |
| Family member C | 1. edge gateway –> camera A (for example, IP network connection)<br>2. edge gateway –> camera B (for example, IP network connection)<br>3. camera A –> camera B (for example, Bluetooth network connection) | |
| Animal A | 1. edge gateway –> camera A (for example, IP network connection)<br>2. edge gateway –> camera B (for example, IP network connection)<br>3. camera A –> camera B (for example, Bluetooth network connection) | |
| Animal B | 1. edge gateway –> camera A (for example, IP network connection)<br>2. edge gateway –> camera B (for example, IP network connection)<br>3. camera A –> camera B (for example, Bluetooth network connection) | |
| Item A | 1. edge gateway –> camera A (for example, IP network connection)<br>2. edge gateway –> camera B (for example, IP network connection)<br>3. camera A –> camera B (for example, Bluetooth network connection) | |
| Item B | 1. edge gateway –> camera A (for example, IP network connection)<br>2. edge gateway –> camera B (for example, IP network connection)<br>3. camera A –> camera B (for example, Bluetooth network connection) | |
| Person | 1. camera C –> camera D –> camera E (for example, via Bluetooth networking)<br>2. camera A –> infrared sensor (via ZigBee networking) | |
| Animal | 1. camera C –> camera D –> camera E (for example, via Bluetooth networking)<br>2. camera A –> infrared sensor (via ZigBee networking) | |
| Item | 1. camera C –> camera D –> camera E (for example, via Bluetooth networking)<br>2. camera A –> infrared sensor (via ZigBee networking) | |
| Vehicle | 1. camera C –> camera D –> camera E (for example, via Bluetooth networking)<br>2. camera A –> infrared sensor (via ZigBee networking) | |
| Family member A track | Edge gateway | |
| Family member B track | Edge gateway | |

TABLE 11-continued

| Content information | Device information | Remarks |
| --- | --- | --- |
| Family member C track | Edge gateway | |
| Animal A track | Edge gateway | |
| Animal A track | Edge gateway | |

This application example establishes connections based on content labels. It is similar to the processing in application example 3 in which the target party comprises one or more device chains, and will not be described in detail here.

It is to be noted that the above application examples are set forth by taking a smart home environment as an example. In practical applications, they can also be applied to other IoT application scenarios, such as intelligent communities, smart factories/industrial parks. The above application examples are set forth by taking the target party being a terminal device as an example. In practical applications, the target party may be not only a terminal device, but also an APP or other software modules. In this regard, no limitation is made in this embodiment.

Figure 15:
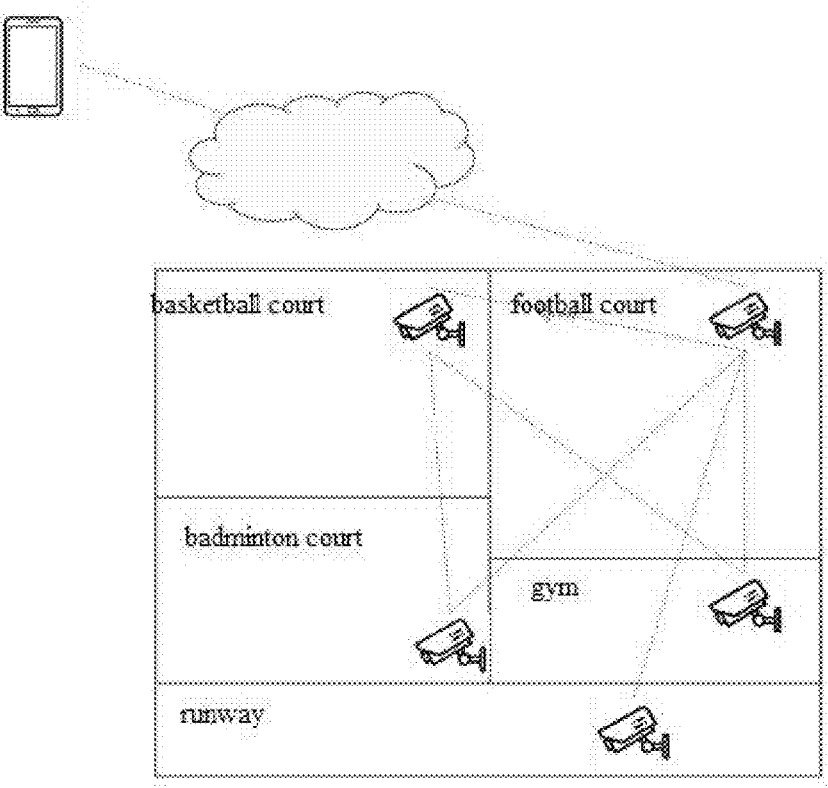
FIG. 15 is a schematic view of the scenario of an intelligent community according to an embodiment of the present disclosure.

In an intelligent community scenario shown in FIG. 15, there will also be multiple terminal devices, such as cameras, different cameras monitoring different places. When the user desires to know where the child is in the community, if he/she sends a connection request to different terminal devices respectively and makes determinations, it causes a heavy burden for the user. By establishing a connection based on a connection request including content information or content labels in this embodiment, the connection establishing process can be simplified and the user experience can be greatly improved.

Figure 16:
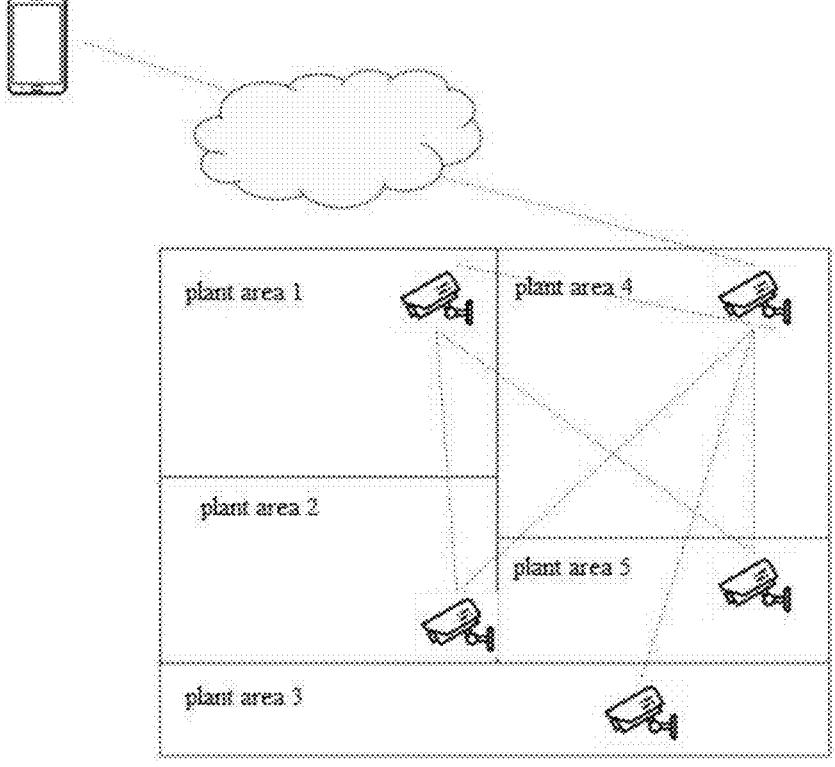
FIG. 16 is a schematic view of the scenario of a smart industrial park according to an embodiment of the present disclosure.

In a smart industrial park scenario shown in FIG. 16, when there is a need to trace the trajectory of an employee or monitor a visitor, a connection with the target party can be directly established by inputting content information or a content label corresponding to the employee or visitor.

Figure 17:
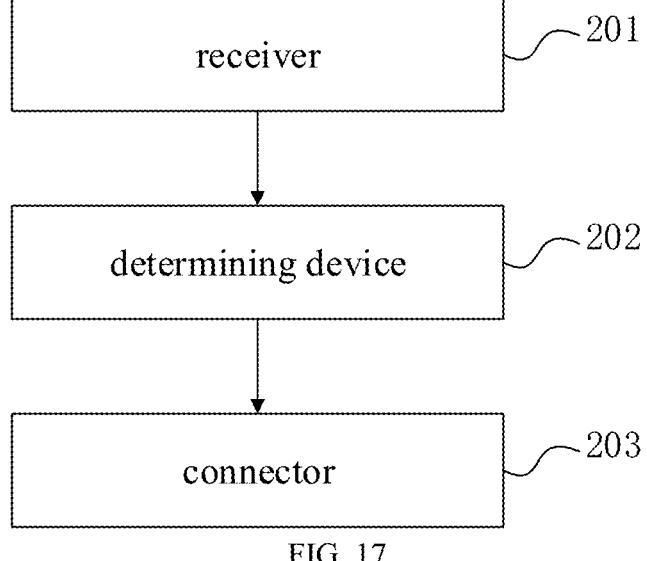
FIG. 17 is a block diagram of an apparatus for establishing a connection according to an embodiment of the present disclosure.

FIG. 17 illustrates a block diagram of an apparatus for establishing a connection. As shown in FIG. 17, this embodiment provides an apparatus for establishing a connection, comprising:

a receiver 201, configured to receive a connection request of a requesting party, wherein the connection request comprises target information specified by the requesting party, and the target information is used to characterize a capability of the target party to which the requesting party desires to connect;

a determining device 202, configured to determine the target party from a relationship mapping table according to the target information specified by the requesting party, the relationship mapping table comprising a correspondence between at least one target party and at least one target information;

a connector 203, configured to establish a connection between the requesting party and at least part of determined target parties.

The apparatus may further comprise: a configurator, configured to establish a mapping table between the target party and the target information.

It can be understood that the receiver 201 can be used to execute step S101 in embodiment 1, and the determining device 202 can be used to execute step S102 in embodiment 1, and the connector 203 can be used to execute step S103 in embodiment 1. For the specific content of each step, reference can be made to embodiment 1, and no detailed description will be provided here. The application examples under various circumstances in embodiment 1 are also applicable to this embodiment.

Obviously, those skilled in the art should be aware that the above-described modules or steps of the present disclosure may be implemented with universal computing devices. They may be concentrated on a single computing device or distributed on a network composed of multiple computing devices. Optionally, they can be implemented by program codes that can be executed by a computing device, so that they can be stored in a storage device to be executed by a computing device, or they can be made into integrated circuit modules, or multiple modules or steps of them can be made into a single integrated circuit module to be implemented. As an example, the receiver and the connector may be, for example, a wireless module, a transceiver, or any device or integrated circuit with communication functions. The determining device may be any device or integrated circuit having processing capacity such as a processor, a microprocessor, and a programmable logic device. In this way, the present disclosure is not limited to any specific hardware and software combination.

This embodiment provides a computer readable storage medium, which stores computer executable instructions. The computer executable instructions, when executed by one or more processors, implement the method for establishing a connection in any embodiment described above.

In this embodiment, the computer readable storage medium may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or light disk. For details of the method for establishing a connection, reference can be made to the embodiments described previously.

This embodiment provides a server, comprising a memory and a processor. The memory stores computer executable instructions, when executed by the processor, implementing the method for establishing a connection on any embodiment described above.

In some implementations, in the case that the target information comprises one of the type information and the type label, the server comprises one of the cloud server and the edge server. That is, when the target information comprises the type information or the type label, the method for establishing a connection in the present disclosure can be implemented not only in the cloud server but also in the edge server.

In some implementations, in the case that the target information comprises one of the content information and the content label, the server comprises the edge server. Since the content information or content label involves user privacy information, if the method for establishing a connection in the present disclosure is implemented in the cloud server, it will easily lead to the leakage of user privacy information. Therefore, the method for establishing a connection can be implemented in the edge server.

In some implementations, in the case that the target information comprises the content label, the server comprises the edge server and the cloud server. Since the content information corresponding to the content label involves user privacy information, if the method for establishing a connection in the present disclosure is completely implemented in the cloud server, it will easily lead to the leakage of user privacy information. Therefore, the method for establishing a connection can be implemented in the cloud server and the edge server. In this case, the cloud server is configured to receive the connection request of the requesting party, the connection request comprising a content label specified by the requesting party, and the edge server is configured to receive the connection request received and sent by the cloud server.

In this implementation, a mapping table between the target party and the content label can be established via the edge server, and the content label is sent to the cloud server. The requesting party selects the content label via the cloud server to generate a connection request including the content label. The requesting party sends the connection request to the cloud server, and the cloud server receives and sends the connection request to the edge server. After the edge server receives the connection request, it determines one or more target parties according to the target information and the mapping table between the target party and the target information, and establishes connections between the requesting party and one or more target parties.

In this embodiment, the processor may be an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components for executing the method described in the aforesaid embodiments. For the method implemented when a computer program run on the processor is executed, reference can be made to specific embodiments of the method described above, and no detailed description will be provided here.

Figure 18:
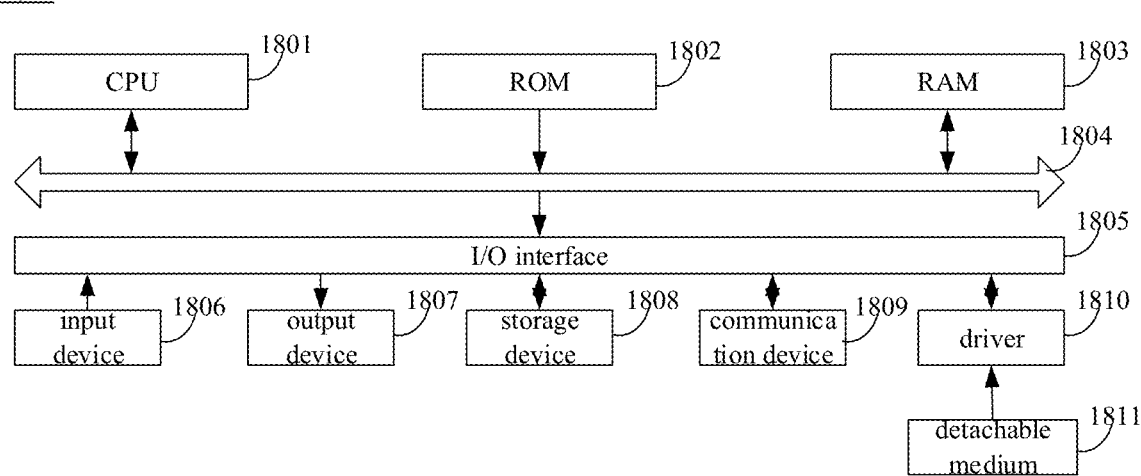
FIG. 18 illustrates a structural schematic view of a computer system adapted for implementing embodiments of the present disclosure.

Next, referring to FIG. 18, FIG. 18 shows a schematic structural view of a computer system adapted to implement embodiments of the present disclosure.

As shown in FIG. 18, the computer system comprises a central processing unit (CPU) 1801, which can perform various appropriate actions and processings according to computer instructions stored in a read-only memory (ROM) 1802 or computer instructions loaded from a storage portion 1808 to a random access memory (RAM) 1803. In the RAM 1803, various computer instructions and data required for the operation instructions of the system are also stored. The CPU 1801, the ROM 1802, and the RAM 1803 are connected to each other through a bus 1804. An input/output (I/O) interface 1805 is also connected to the bus 1804.

The following components are connected to an I/O interface 1805: an input device 1806 including a keyboard, a mouse, etc.; an output device 1807 including a cathode ray tube (CRT), a liquid crystal display (LCD), a speaker, etc.; a storage device 1808 including a hard disk, etc.; and a communication device 1809 including a network interface card such as a LAN card, a modem, etc. The communication device 1809 performs communication processing via a network such as the Internet. A driver 1810 is also connected to the I/O interface 1805 as needed. A detachable medium 1811, such as a magnetic disk, an optical disk, a magneto-optical disk, a semiconductor memory, etc., is installed on the driver 1810 as needed, so that the computer instructions read therefrom can be installed into the storage device 1808 as needed.

In particular, according to the embodiment of the present disclosure, the process described above with reference to the flow chart may be implemented as a computer software program. For example, an embodiment of the present disclosure comprises a computer program product including computer instructions carried on a machine-readable medium, and the computer instructions include program codes for executing the method shown in the flow chart. In such an embodiment, the computer instructions may be downloaded from the network by the communication device 1809 and installed, and/or installed from the detachable medium 1811. When the computer instructions are executed by the central processing unit (CPU) 1801, the above functions defined in the system of the present disclosure are executed.

It is to be noted that the computer-readable medium shown in the present disclosure may be a computer-readable signal medium or a computer-readable storage medium, or any combination thereof. For example, it may be, but not limited to, an electrical, magnetic, optical, electromagnetic, infrared, or semiconductor system, apparatus or device, or any combination thereof. More specific examples of computer-readable storage media may include, but are not limited to: an electric connections with one or more wires; a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores computer instructions, and the computer instructions may be used by or in combination with an instruction execution system, apparatus or device. In the present disclosure, the computer-readable signal medium may include a data signal propagated in a baseband or as a part of a carrier wave, and computer-readable program codes are carried therein. This propagated data signal may take various forms, including but not limited to an electromagnetic signal, an optical signal, or any suitable combination thereof. The computer-readable signal medium may also be any computer-readable medium other than the computer-readable storage medium. The computer-readable medium may send, propagate or transmit computer instructions for use by or in combination with an instruction execution system, apparatus or device. The program codes contained on the computer-readable medium can be transmitted by any suitable medium, including but not limited to: wireless, wire, optical cable, RF, etc., or any suitable combination thereof.

The present application further provides a computer program product or a computer program. The computer program product or computer program comprises computer instructions. The computer program product or computer program may be stored in a computer readable storage medium. The processor of the computing device reads computer instructions from the computer readable storage medium. The processor executes the computer instructions, enabling the computing device to execute the method provided in the above various implementations.

In several embodiments provided by the embodiments of the present disclosure, it should be understood that the disclosed systems and methods can also be implemented in other ways. The system and method embodiments described above are only illustrative.

It is to be noted that in the present disclosure, the terms "comprising", "including" or any other variation thereof are intended to cover non-exclusive inclusion, so that a process, method, article or device that includes a series of elements includes not only those elements, but also other elements that are not explicitly listed, or further elements inherent in such a process, method, article or device. In the absence of further restrictions, defining elements with the statement "comprising a . . . " does not exclude the existence of other identical elements in the process, method, article or device comprising said elements.

Although the present disclosure has disclosed the above embodiments, said contents are just implementations adopted to facilitate understanding of the present disclosure, but not intended to limit the present disclosure. Any skilled person in the technical field to which the present disclosure pertains can make any modification and variation in the form and details of implementation without departing from the spirit and scope revealed by the present disclosure. However, the protection scope of the present disclosure shall still be based on the scope defined in the appended claims.

What is claimed is:

1. A method for establishing a connection, comprising:

receiving a connection request of a requesting party, wherein the connection request comprises target information specified by the requesting party, and the target information being for characterizing a capability of a target party to which the requesting party desires to connect;

determining target parties from a relationship mapping table according to the target information specified by the requesting party, the relationship mapping table comprising a correspondence between at least one target party and at least one target information; and establishing connections between the requesting party and at least part of the determined target parties, wherein the determined target parties are multiple in number and form a device chain, the device chain is a combination of target parties with connection relationships built according to a network topology structure, and wherein said establishing connections between the requesting party and at least part of the determined target parties comprises:

reconstructing the connection request, the reconstructed connection request comprising identification information of a target party at a chain head of the device chain; and sending the reconstructed connection request to the target party at the chain head of the device chain to establish connections between the requesting party and at least part of the determined target parties.

2. The method for establishing a connection according to claim 1, wherein the target information comprises at least one of type information and content information, the type information is indicative of a type of information that can be collected by a target party, and the content information is indicative of content of information that can be collected by a target party.

3. The method for establishing a connection according to claim 2, wherein the relationship mapping table is established by operations comprising:

acquiring at least one of type information and content information of at least one target party;

establishing a relationship mapping table in response to acquiring type information, so that the relationship mapping table comprises a correspondence between the at least one target party and the type information; and establishing a relationship mapping table in response to acquiring content information, so that the relationship mapping table comprises a correspondence between the at least one target party and the content information.

4. The method for establishing a connection according to claim 3, wherein said acquiring at least one of type information and content information of the at least one target party comprises:

sending an information acquisition request to acquire at least one of type information and content information of the at least one target party; or acquiring at least one of type information and content information reported by the at least one target party during a registration process.

5. The method for establishing a connection according to claim 1, wherein the target information comprises an information label, the information label comprising at least one of a type label established according to type information and a content label established according to content information; and wherein the type information is indicative of a type of information that can be collected by a target party, and the content information is indicative of content of information that can be collected by a target party.

6. The method for establishing a connection according to the claim 5, wherein the relationship mapping table is established by operations comprising:

establishing a mapping table between at least one target party and at least one information label as the relationship mapping table, and wherein said determining target parties from a relationship mapping table according to the target information specified by the requesting party comprises:

determining the target party from the mapping table between at least one target party and at least one information label according to the target information specified by the requesting party.

7. The method for establishing a connection according to the claim 6, wherein said establishing a mapping table between at least one target party and at least one information label comprises:

acquiring at least one of type information and content information of the at least one target party;

in response to acquiring type information, determining an information label according to the type information;

in response to acquiring content information, determining an information label according to the content information; and based on a determined information label, establishing a mapping table between the at least one target party and the determined information label.

8. The method for establishing a connection according to the claim 1, wherein said sending the reconstructed connection request to the target party at the chain head of the device chain to establish connections between the requesting party and at least part of the determined target parties further comprises:

acquiring first response information sent by the target party at the chain head for the reconstructed connection request, the first response information comprising a result of performing an operation by the target party at the chain head according to the target information, the result indicating whether the target party at the chain head performs the operation successfully or not;

when the first response information is success, establishing a connection between the requesting party and the target party at the chain head;

when the first response information is non-success, acquiring second response information of a target party connected to the target party at the chain head of the device chain for the reconstructed connection request, the second response information comprising a result of performing an operation by a connected target party according to the target information, the result indicating whether the connected target party performs said operation successfully or not; and when the second response information is success, establishing a connection between the requesting party and the target party connected to the target party at the chain head of the device chain.

9. The method for establishing a connection according to the claim 1, wherein said sending the reconstructed connection request to the target party at the chain head of the device chain to establish connections between the requesting party and at least part of the determined target parties further comprises:

acquiring third response information sent by a target party at a chain tail of the device chain, the third response information comprising a result of performing an operation by the target party at the chain tail according to the target information, the result indicating whether the target party at the chain tail performs the operation successfully or not; and when the third response information is success, establishing a connection between the requesting party and the target party at the chain tail of the device chain.

10. The method for establishing a connection according to claim 1, characterized in that the target information does not comprise identification information of the target party.

11. A non-transitory computer readable storage medium storing a computer executable instruction, the computer executable instruction, when executed by one or more processors, implementing the method for establishing a connection according to claim 1.

12. A server, comprising a memory and a processor, the memory storing a computer executable instruction, the computer executable instruction, when executed by a processor, implementing the method for establishing a connection according to claim 1.

13. A computer program product, comprising a computer executable instruction stored on a non-transitory computer-readable storage medium, wherein the computer executable instruction, when executed by a processor, executes the method for establishing a connection according to claim 1.

\* \* \* \* \*